(12) United States Patent
Tumpold

(10) Patent No.: US 10,935,451 B2
(45) Date of Patent: Mar. 2, 2021

(54) SENSOR ARRANGEMENT AND METHOD FOR TESTING A SENSOR ARRANGEMENT

(71) Applicant: Infineon Technologies AG, Neubiberg (DE)

(72) Inventor: David Tumpold, Kirchheim b Muenchen (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 315 days.

(21) Appl. No.: 16/025,703

(22) Filed: Jul. 2, 2018

(65) Prior Publication Data

US 2019/0017893 A1 Jan. 17, 2019

(30) Foreign Application Priority Data

Jul. 12, 2017 (DE) .......................... 102017211970.5

(51) Int. Cl.
G01L 27/00 (2006.01)
G01L 9/00 (2006.01)
G01L 19/04 (2006.01)
G01L 11/02 (2006.01)

(52) U.S. Cl.
CPC .......... G01L 27/005 (2013.01); G01L 9/0042 (2013.01); G01L 11/02 (2013.01); G01L 19/04 (2013.01)

(58) Field of Classification Search
CPC ....... G01L 27/002; G01L 19/04; G01L 9/025; G01K 13/00; G01K 1/20
See application file for complete search history.

(56) References Cited

U.S. PATENT DOCUMENTS

| 7,258,015 | B1* | 8/2007 | Shaw ....................... G01B 5/30 |
| | | | 73/708 |
| 7,918,135 | B2 | 4/2011 | Hammerschmidt |
| 2011/0132096 | A1* | 6/2011 | Ricks ...................... G01L 9/065 |
| | | | 73/708 |
| 2012/0197554 | A1 | 8/2012 | Glaudel et al. |
| 2014/0111326 | A1* | 4/2014 | Borisenko ........... B60C 23/0454 |
| | | | 340/447 |

(Continued)

FOREIGN PATENT DOCUMENTS

| DE | 102010001153 A1 | 9/2010 |
| DE | 102016216875 A1 | 3/2017 |
| EP | 0798552 A1 | 10/1997 |

*Primary Examiner* — Suman K Nath
(74) *Attorney, Agent, or Firm* — Slater Matsil, LLP

(57) ABSTRACT

In accordance with an embodiment, a sensor arrangement includes a pressure transducer configured to be in fluid connection with a volume region having a fluid, where the pressure transducer is configured to output a pressure signal in response to a pressure change in the volume region, the pressure signal comprising a signal curve that depends on the pressure change; a heating element configured to provide a defined temperature change of the fluid situated in the volume region, wherein the defined temperature change of the fluid brings about a corresponding pressure change in the volume region; and a processing device configured to ascertain a current functional parameter of the pressure transducer based on the signal curve of the pressure signal obtained in the volume region due to the defined temperature change provided by the heating element.

33 Claims, 7 Drawing Sheets

(56) References Cited

U.S. PATENT DOCUMENTS

2014/0235984 A1* 8/2014 Wilbur .................. A61B 5/155
    600/365
2015/0101395 A1* 4/2015 Dehe .................. G01N 29/2425
    73/24.02
2017/0067859 A1 3/2017 Kolb et al.

* cited by examiner

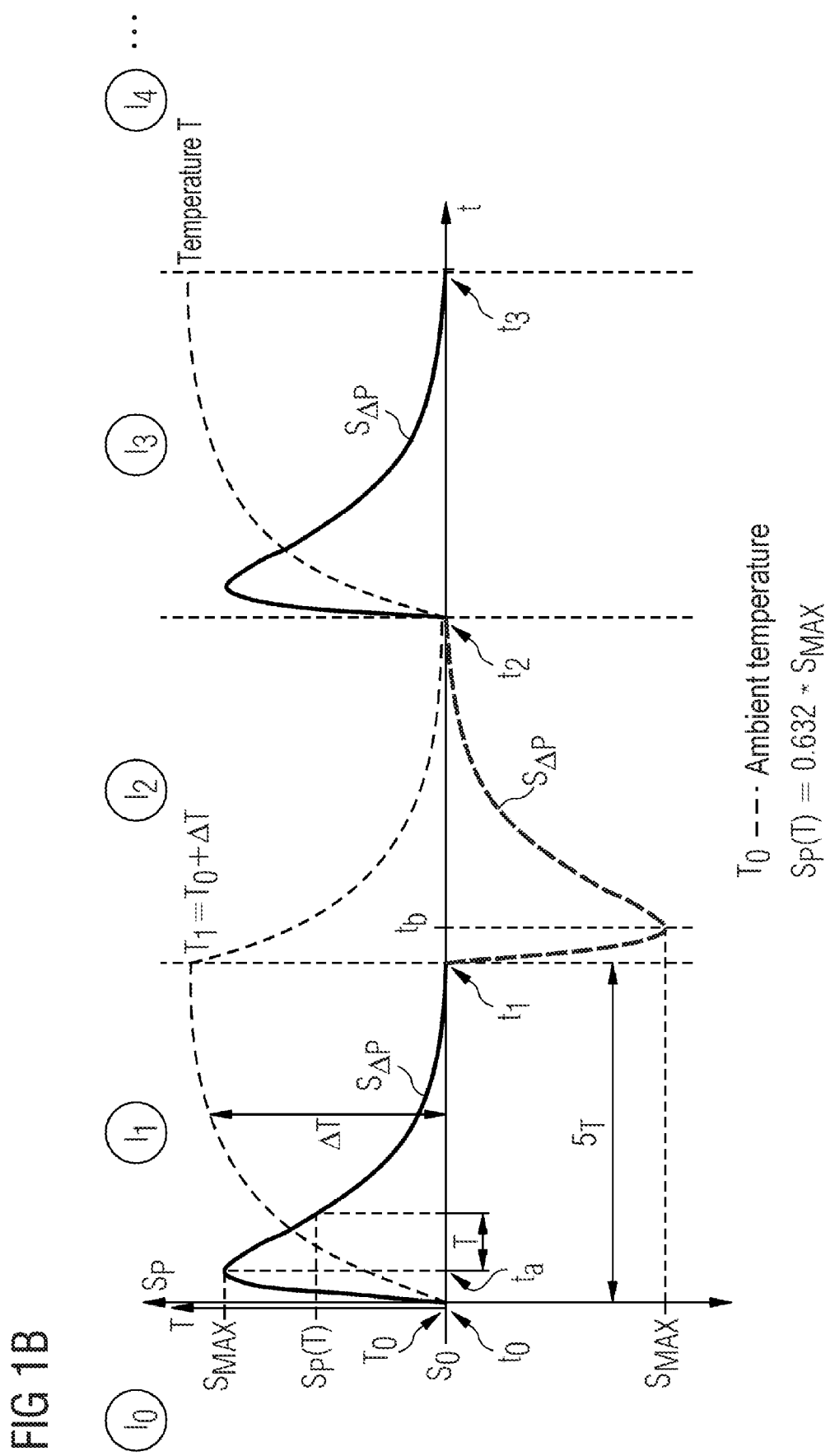

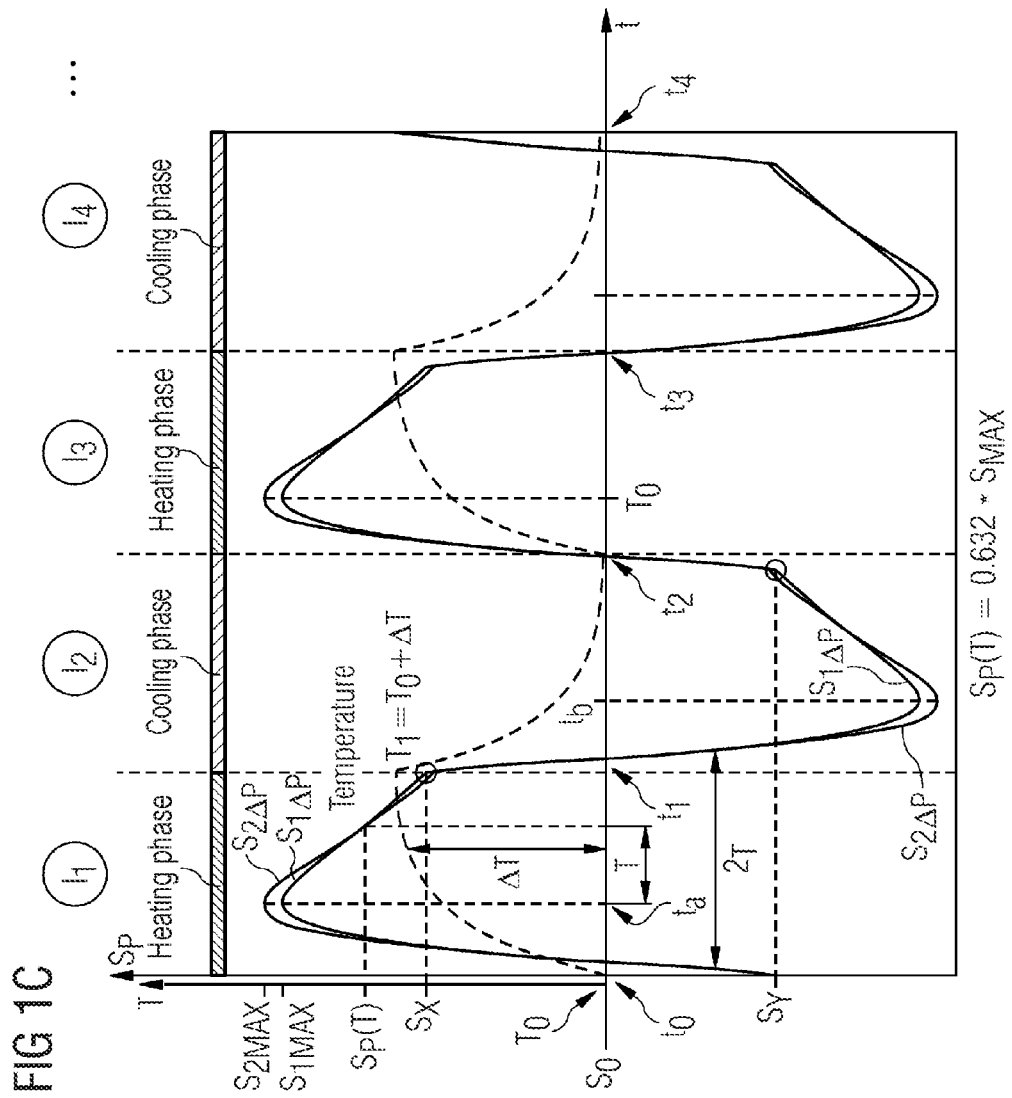

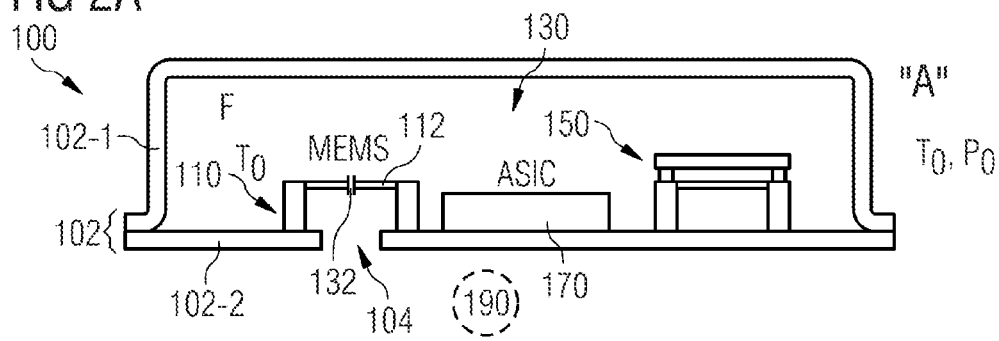
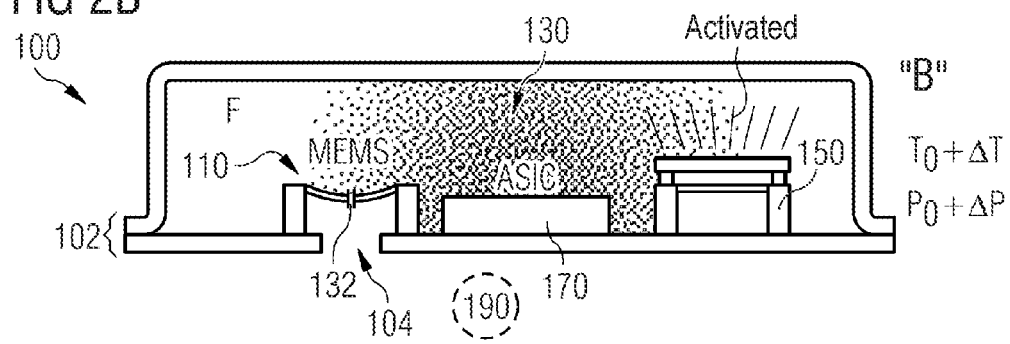
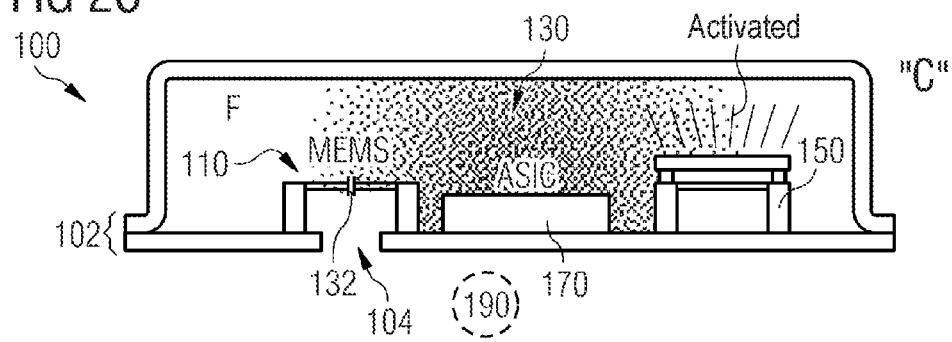
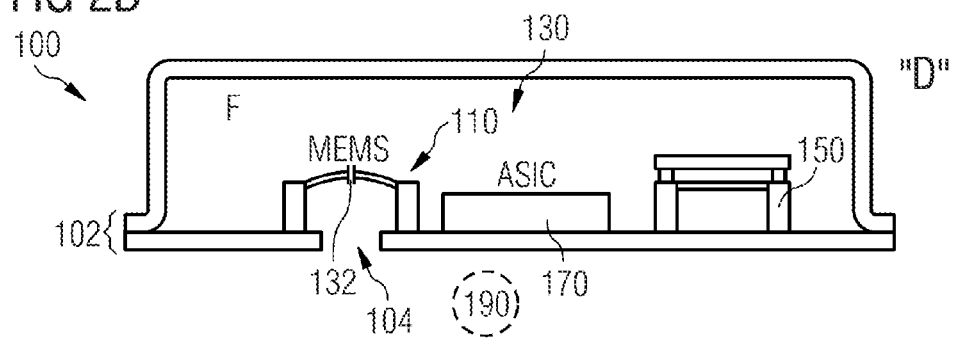

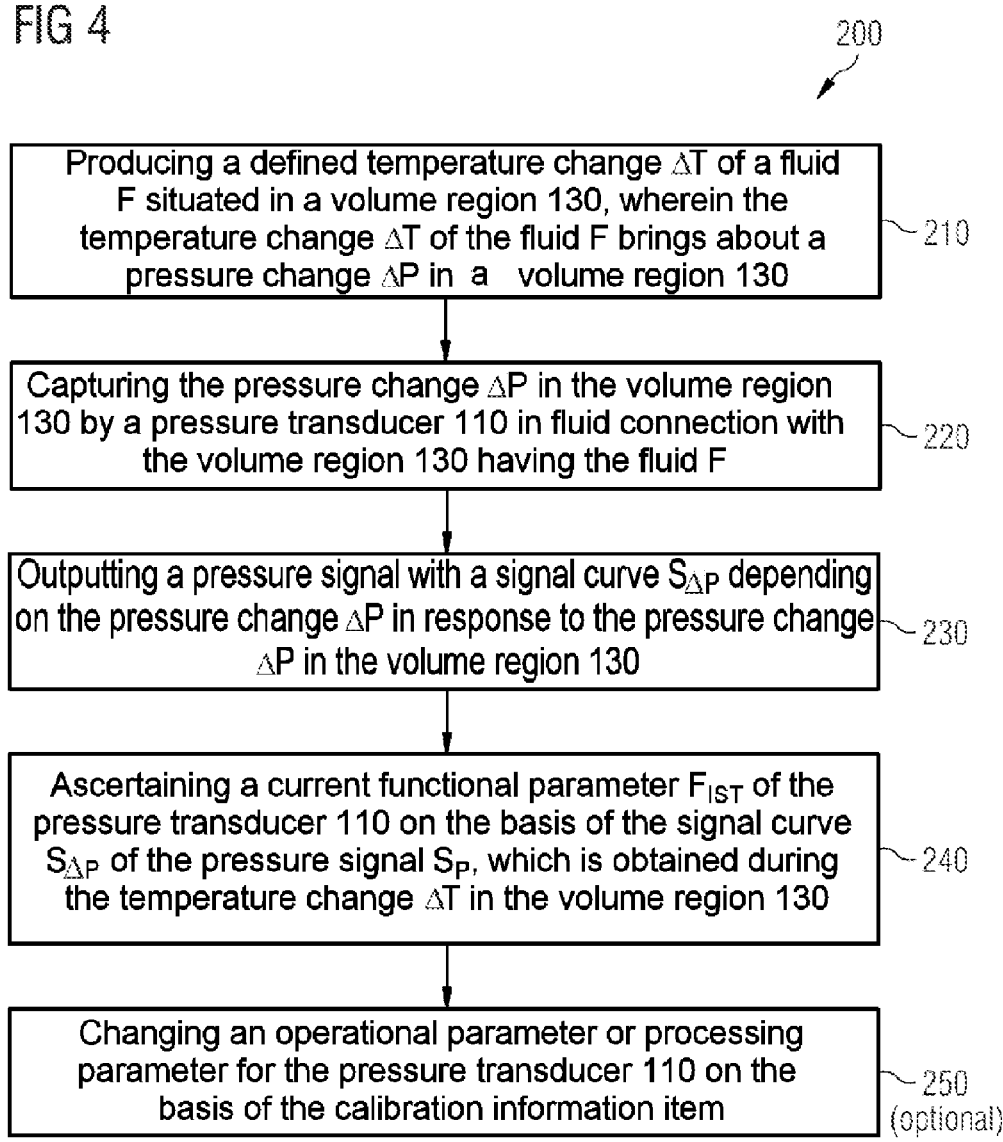

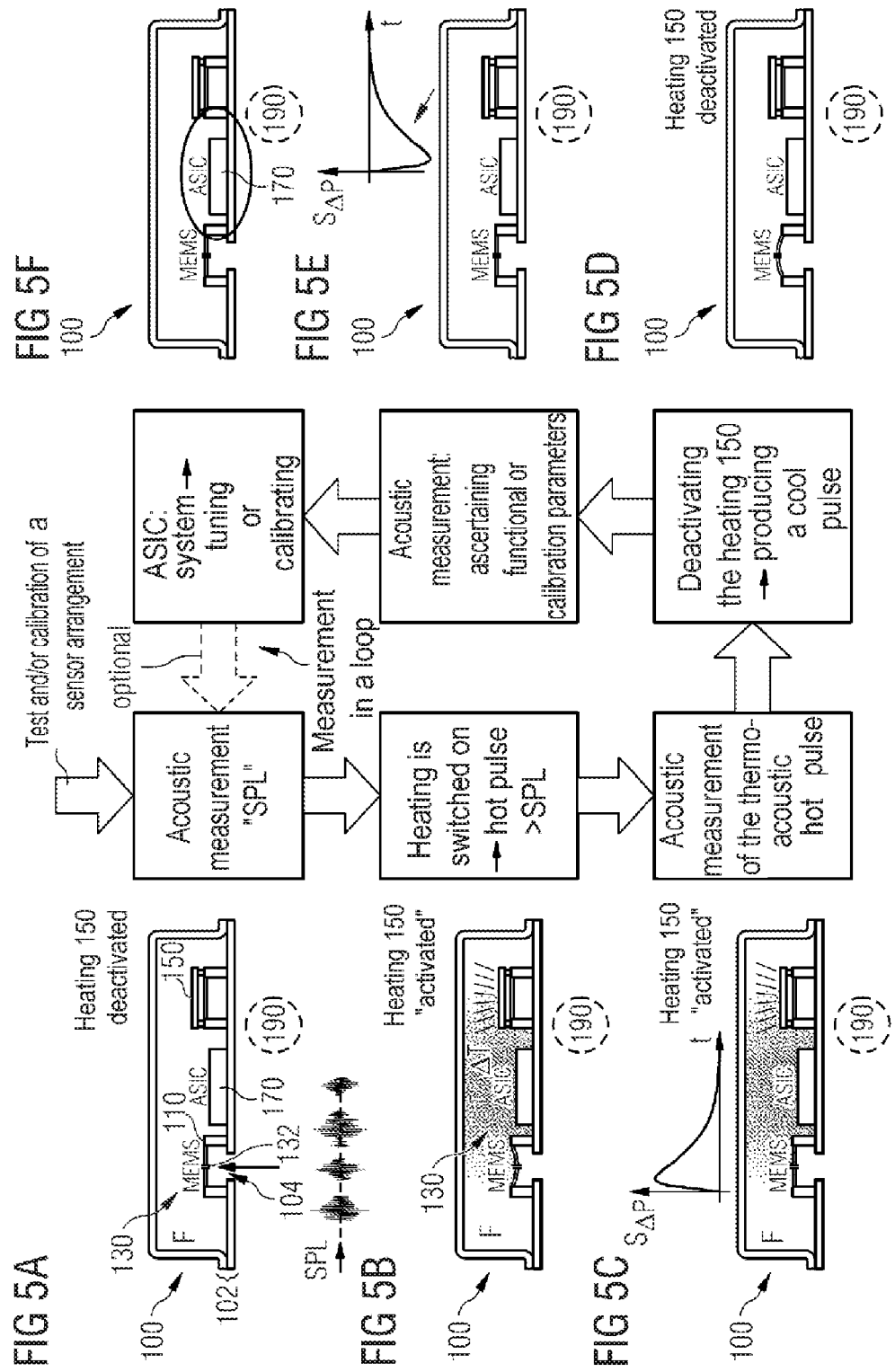

SENSOR ARRANGEMENT AND METHOD FOR TESTING A SENSOR ARRANGEMENT

This application claims the benefit of German Application No. 102017211970.5, filed on Jul. 12, 2017, which application is hereby incorporated herein by reference in its entirety.

TECHNICAL FIELD

The present application related generally to sensors and, in particular embodiments to a sensor arrangement and a method for testing a sensor arrangement.

BACKGROUND

Capturing environmental or ambient parameters, such as noise, sound, temperature and gases or gas compositions in the ambient atmosphere, for example, is becoming ever more important within the scope of the implementation of a corresponding sensor system within mobile devices, but also in the application in home automation ("smart home") and in the automotive sector. Thus, harmful gas concentrations, elevated CO or NOx concentrations, for example, may occur on account of air pollution or else on account of a malfunction of devices situated in the surroundings. Thus, the well-being of the person or any living being in general is influenced strongly by the air quality. Consequently, capturing gases by means of cost-effective, permanently available and linked sensors represents a theme that will come ever more prominently to the fore in future. However, with the ever more comprehensive use of sensors, there is also, in particular, a need to determine, with as little outlay as possible but nevertheless exceedingly reliably, whether the sensor for capturing an ambient parameter is operating correctly or whether a malfunction of the sensor is present or whether a relevant deviation from the predetermined operational parameters of the sensor is already present.

SUMMARY

According to exemplary embodiments, a sensor arrangement 100 comprises a pressure transducer 110 with a fluid connection to a volume region 130 having a fluid F, wherein the pressure transducer 110 is embodied, in response to a pressure change ΔP in the volume region 130, to output a pressure signal $S_P$ with a signal curve $S_{\Delta P}$ depending on the pressure change ΔP, a heating element 150 that is embodied to bring about a defined temperature change ΔT of the fluid F situated in the volume region, wherein the temperature change ΔT of the fluid F brings about a pressure change ΔP in the volume region 130, and a processing device 170 that is embodied to ascertain a current functional parameter $F_{IST}$ of the pressure transducer 110 on the basis of the signal curve $S_{\Delta P}$ of the pressure signal $S_P$ obtained in the volume region 130 in the case of a temperature change ΔT brought about by the heating element 150.

According to exemplary embodiments, a method 200 for testing a sensor arrangement 100 includes producing 210 a defined temperature change ΔT of a fluid F situated in a volume region 130, wherein the temperature change ΔT of the fluid F brings about a pressure change ΔP in the volume region 130, capturing 220 the pressure change P in the volume region 130 by a pressure transducer 110 in fluid connection with the volume region 130 having the fluid F, outputting 230 a pressure signal with a signal curve $S_{\Delta P}$ depending on the pressure change ΔP in response to the pressure change ΔP in the volume region 130, and ascertaining 240 a current functional parameter $F_{IST}$ of the pressure transducer 110 on the basis of the signal curve $S_{\Delta P}$ of the pressure signal $S_P$, which is obtained during the temperature change ΔT in the volume region 130.

Consequently, exemplary embodiments relate to an acoustic test concept for a sensor arrangement having a pressure transducer and to ascertaining calibration information items for the sensor arrangement having the pressure transducer, wherein the pressure transducer can be embodied, for example, as a capacitive, inductive or piezoelectric sound transducer, such as a microphone, for example.

So-called PAS (PAS=photoacoustic spectroscopy) sensors using a microphone use thermal sources or heating elements to produce the required IR (IR=infrared) radiation. According to exemplary embodiments, use can be made of precisely this thermal source, for example, in order to produce an acoustic pressure change in a volume region, i.e., a measurement volume or back volume of a microphone, wherein a pressure transducer or microphone has a fluid connection to the volume region. On the basis of the signal curve of a pressure change in the volume region, captured by the microphone and caused on account of the heating of the fluid situated therein that is produced in a defined and targeted manner, it is possible, for example, to determine functional parameters of the pressure transducer, such as, e.g., the sensitivity thereof, etc., or else further system properties of the sensor arrangement. A known temperature change, by way of a defined energy, for example, is brought about in the volume region by way of the thermal source that is effective as a heating element. This temperature change can be obtained on the basis of the result of an electrical of thermal characterization of the heat source for the factory or customer test case.

Using this procedure for testing and/or calibrating the sensor arrangement having the pressure transducer, there is no need, for example, for an additional external sound source, wherein the internal thermal source, for example, is used as a thermo-acoustic transducer, wherein the defined temperature change in the volume region brought about by this thermo-acoustic transducer is captured or measured by way of the pressure change in the volume region, resulting therefrom, by means of the pressure transducer or microphone. Any component providing a defined amount of heat can be used as a thermal heat source.

According to exemplary embodiments, the signal curve of the pressure signal, which is obtained in the case of a temperature change in the volume region brought about by the heating element, now can be evaluated on the basis of the "ideal gas law" in order to obtain current operational properties of the pressure transducer, wherein these measured operational properties can be compared to setpoint values in order, ultimately, to ascertain a calibration information item for the pressure transducer or for the sensor arrangement having the pressure transducer.

BRIEF DESCRIPTION OF THE DRAWINGS

Exemplary embodiments of apparatuses and/or methods are described in more detail below in an exemplary manner, with reference being made to the attached figures. In the figures:

FIGS. 1a-c show a schematic diagram of a sensor arrangement according to an exemplary embodiment;

FIGS. 2a-d show a basic illustration of the sensor arrangement having a sound transducer (microphone) in different operational states for ascertaining the signal curve of the pressure signal in the case of a temperature change, caused by the heating element, in the volume region according to an exemplary embodiment;

FIG. 4 shows a method for testing a sensor arrangement according to an exemplary embodiment; and FIGS. 5A-5F show an exemplary flowchart for calibrating a sensor arrangement according to an exemplary embodiment.

DETAILED DESCRIPTION OF ILLUSTRATIVE EMBODIMENTS

Figure 1A:
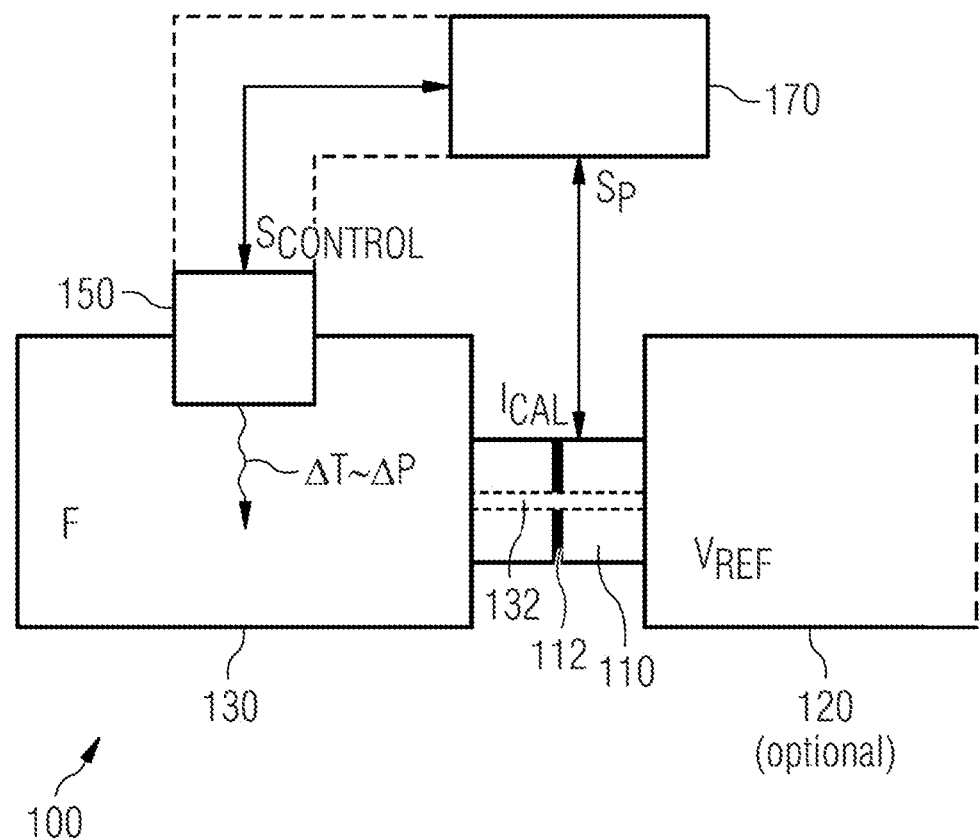

Before exemplary embodiments of the present invention are explained more specifically in detail below with reference to the drawings, it is pointed out that identical functionally equivalent or identically acting elements, objects, functional blocks and/or method steps are provided with the same reference signs in the different figures, and so the description of said elements, objects, functional blocks and/or method steps that is presented in different exemplary embodiments is mutually interchangeable or can be applied to one another.

Exemplary embodiments relate to a sensor arrangement and a method for testing or calibrating a sensor arrangement, and, in particular to an in situ test of thermo-acoustic microphones or of sensor arrangements using thermo-acoustic microphones. Further, exemplary embodiments relate generally to a calibration method of a sound transducer, such as, e.g., a microphone, or photoacoustic sensor arrangement (PAS=photoacoustic spectroscopy) or of a gas sensor. In some embodiments, a functional parameter of a sensor arrangement or the functionality of a sensor arrangement is monitored and appropriate calibration information is determined therefrom.

Below, the basic construction of a sensor arrangement 100 and the basic functionality thereof according to exemplary embodiments is presented on the basis of the schematic illustrations of FIGS. 1a-c.

The sensor arrangement 100 has a pressure transducer 110 with a fluid connection to a volume region 130 having a fluid F. According to exemplary embodiments, a fluid may have a gas or gas mixture or a liquid or liquid mixture. Now, the pressure transducer 110 is embodied, in response to a pressure change $\Delta P$ in the volume region 130, to output a pressure signal $S_P$ with a signal curve $S_{\Delta P}$ depending on the pressure change $\Delta P$, for example. Now, the sensor arrangement 100 further has a heating element 150 that is embodied to bring about a defined temperature change $\Delta T$ of the fluid F situated in the volume region 130, wherein a temperature change $\Delta T$ of the fluid F brings about a pressure change $\Delta P$ in the volume region 130. The sensor arrangement 100 further has a processing device 170 that is embodied to ascertain a current functional parameter $F_{IST}$ of the pressure transducer 110, or else a calibration information item $I_{CAL}$ for the pressure transducter 110, on the basis of the signal curve $S_{\Delta P}$ of the pressure signal $S_P$ obtained in the volume region 130 in the case of a temperature change $\Delta T$ brought about by the heating element 150. At the same time, the processing device 170 can also assume, or else directly contain, the actuation of the heating element 150.

The optional configurations of the sensor arrangement 100 according to further exemplary embodiments, described below, can be applied alternatively or else in any combination (provided nothing else is explicitly presented) to the sensor arrangement 100 illustrated in FIG. 1.

According to an exemplary embodiment, the processing device 170 is now embodied to ascertain a current operational parameter $F_{IST}$ of the pressure transducer 110 on the basis of the signal curve $S_{\Delta P}$ of the pressure signal SP and in order to ascertain the calibration information item $I_{CAL}$ for the pressure transducer 110 therefrom. According to exemplary embodiments, the processing device 170 can further be embodied to control, i.e., activate and subsequently deactivate again, the heating element 150 with a control signal $S_{CONTROL}$.

According to exemplary embodiments, the heating element 150 further can be embodied as part of the processing device 170.

According to exemplary embodiments, the pressure transducer 110 can be embodied as an absolute pressure sensor element, relative pressure sensor element and/or differential pressure sensor element. Further, the pressure transducer 110 can be embodied to capture the pressure change $\Delta P$ in the volume region 130 in relation to a reference pressure $P_{REF}$ in an optional reference volume region 190.

According to exemplary embodiments, an equalization opening or ventilation opening 132 may be provided (optionally) between the volume region 130 and the reference volume region 190. According to exemplary embodiments, the volume region 130 and the reference volume region 190 also can be embodied separately from one another (not shown in FIG. 1a).

Now, the heating element 150 is embodied to bring about the defined temperature change $\Delta T$ in the volume region 130 with the fluid F situated therein, while the reference volume region 190 may be uninfluenced by the temperature change $\Delta T$ of the fluid F in the volume region 130, for example, apart from substantially unavoidable heat conduction or heat transmission effects (convection), which are generally negligibly low.

According to exemplary embodiments, the pressure transducer 110 has a membrane or lamella 112 that is deflectable on the basis of the acting pressure or the acting pressure change $\Delta P$, wherein this mechanical deflection can be evaluated or read capacitively, inductively, piezo-resistively, optically, for example, or by means of any other suitable physical effect. By way of example, reading and evaluating the pressure signal can be carried out by the processing device 170.

In the case of a capacitive principle, a deflectable membrane 112 of the pressure transducer 110 thus is exposed to the pressure to be measured. The bend or deflection of the membrane causes a change in the distance between the membrane and a stationary electrode or counterelectrode (not shown in FIG. 1), as a result of which the capacitance between the membrane and the counterelectrode varies.

According to further exemplary embodiments, the deflection or the geometric deformation of the membrane can also be read by means of, e.g., implanted, piezo-resistive resistors in the membrane (not shown in FIG. 1), for example, wherein the specific resistance of the piezo-resistive resistors changes based on the geometric deformation on account of the mechanical tension caused in the material of the membrane. This change in resistance of the piezo-resistive resistor elements on the basis of the deformation, caused by pressure, of the deformable membrane can be evaluated in turn.

According to exemplary embodiments, the deformation of the membrane on account of the acting pressure change $\Delta P$ can also be captured optically by virtue of the degree of mechanical deflection of the deformable membrane being captured optically.

According to exemplary embodiments, use can be made further of resonant pressure sensors, wherein, in the case of a resonant pressure sensor, a correspondingly designed resonator is connected to the element that detects the pressure, wherein the deformation of the element that detects the pressure has a deformation of the resonator as a consequence and hence a corresponding change in the resonant frequency of the resonator, which can be read and evaluated in turn. Consequently, the resonant frequency of the resonator has a dependence on the pressure to be measured.

The list, above, of different pressure sensor elements should only be considered to be exemplary and not exhaustive since substantially any pressure sensor element can be used as a pressure transducer 110 for the sensor arrangement 100.

According to an exemplary embodiment, the heating element 150 is embodied, upon activation of same, to bring about a temperature increase $\Delta T$ that is as defined as possible of the fluid F situated in the volume region 130. Further, according to an exemplary embodiment, the heating element 150, upon deactivation following an activated state of the heating element 150, can be further embodied to bring about a temperature reduction $\Delta T$ of the fluid F situated in the volume region 130.

As the explanations below will further show, the heating element 150 can be arranged in full, or else only in part, within the volume region 130 with the fluid F. The heating element 150 also can be arranged outside of the volume region 130 provided the thermal energy provided by the heating element 150 can bring about (directly or indirectly) a temperature change of the fluid F situated therein.

The heating element or else the thermal source 150 is therefore able to modify the fluid temperature, the gas or liquid temperature, for example, in the volume region 130 in a targeted manner, wherein substantially any thermal source can be used to this end. For thermal sources or heating elements 150, use can be made of radiation emitters, such as IR (IR=infrared) emitters, for example, the emitted electromagnetic radiation of which is convertible into thermal energy in the volume region 130 or able to bring about (directly or indirectly) a temperature change of the fluid situated therein, or else of circuit elements such as resistor elements, transistors or diodes, which may be arranged on an ASIC (ASIC=application-specific integrated circuit), for example, or which else may be embodied as separate components. Further, impedances can also be used as thermal sources 150, said impedances, e.g., being switched in the frequency range in order to bring about power losses in these components, with these power losses, in turn, bringing about the temperature increase in the volume region with the fluid F situated therein. Further, the heating element 150 also can be embodied in the pressure transducer 110 and, therein, at the membrane or lamella, for example, which itself then can be effective as a heating structure.

According to an exemplary embodiment, the pressure transducer 110 can be embodied as a sound transducer, for example, wherein the microphone membrane or else the back plate (counterelectrode) itself can be effective as the heating structure of the heating element 150. According to an exemplary embodiment, the heating element 150 also can be implemented by an absorption area within the volume region 130, wherein an optical source, i.e., a source that emits electromagnetic radiation, can be embodied to activate the defined, e.g., dark or black, absorption area by irradiation with light, e.g., laser light, i.e., to bring about a defined temperature increase of the absorption area and hence of the volume region 130 as well.

It is clear from the explanations above that, according to exemplary embodiments, substantially any heat source that can bring about a defined temperature change of the fluid F situated in the volume region 130 can be used as the heating element 150 in the measurement volume or volume region 130. Consequently, the list, above, of heating elements should be considered to be only exemplary and not exhaustive.

According to an exemplary embodiment, the heating element 150 can be embodied to introduce a constant amount of heat (energy) into the volume region 130 for a predetermined time period. According to a further exemplary embodiment, the heating element 150 can be embodied to provide a variable heat energy/time function as a controllable heat source if use is made of a regulator to target a defined temperature, for example.

According to an exemplary embodiment, the "ideal gas law" can be applied to the pressure curve, i.e., to the current pressure P or the pressure change $\Delta P$ in the volume region 130, for the sensor arrangement 100, illustrated in FIG. 1a, with the pressure transducer 110 arranged between the volume region 130 and the reference volume region 190:

$$PV=nRT,$$

where P=current pressure, V=volume, n=number of moles, R=gas constant and T=temperature of the fluid F in the volume region 130.

A volume change (volume increase or volume reduction) $\Delta V$, and resulting therefrom, a pressure change in the form of a pressure increase or pressure reduction $\Delta P$ is brought about in the volume region 130 proceeding from a defined temperature change $\Delta T$ of the fluid F in the volume region 130 by means of the heating element 150, while a ventilation or equalization is brought about as a pressure equalization between the volume region 130 and the reference volume region 190 through the equalization opening or ventilation opening 132. According to the formula above, the pressure P will be modified according to its known fluid properties (mR), while the temperature T is set with the heating element 150 as a thermal source, while the volume V of the volume region 130 can be considered to be fixedly set up to the transition point, i.e., up to the onset of the ventilation or the said ventilation becoming effective.

On account of the temperature change $\Delta T$ in the volume region 130, the pressure P changes taking account of the ventilation time constant or pressure equalization time constant, wherein this can be considered, for example, as a volume equalization between the volume region 130 and the reference volume region 190. Should the thermal pulse for the temperature change $\Delta T$ now be defined and known within a tolerance range, the latter can be used as a calibration pulse, for example, since the various properties of the pressure transducer 110 can be derived or extracted from the signal curve $S_{\Delta P}$ depending on the pressure change $\Delta P$, such as, e.g., the sensitivity from the absolute pressure and the transition behavior in the form of the limit frequency or ventilation frequency.

FIG. 1b now, furthermore, presents an exemplary signal curve $S_{\Delta P}$ of a differential pressure sensor, e.g. a microphone, depending on the pressure change $\Delta P$ during different time intervals IN with N=0, 1, 2, 3, . . . , wherein, according to an exemplary embodiment, odd temperature intervals $I_1$, $I_3$, etc., exhibit, e.g., a state in which the heating element 150, upon activation thereof, brings about a defined temperature increase $\Delta T$ of the fluid F situated in the volume region 130 while, in even time intervals $I_2$, $I_4$, etc., a temperature reduction $\Delta T$ of the fluid F situated in the volume region 130 is brought about upon a deactivation of the heating element 150 following an activated state of the heating element 150.

By way of example, for presentation purposes, the intervals $I_N$ in FIG. 1b have a duration $5\tau$, where T is the time constant T of the exponential function of the decreasing portion of the signal curve $S_{\Delta P}$. Consequently, the assumption can be made that the membrane of the pressure transducer 110 is relaxed again at the end of the intervals $I_N$, i.e., the system is in the original state again. However, the duration of the intervals $I_N$ can be chosen essentially as required, for example, with $N \geq 1$, provided that the desired functional parameter still is derivable from the resultant signal curve $S_{\Delta P}$.

In the illustration of FIG. 1b, the pressure signal $S_P$ with the signal curve $S_{\Delta P}$ depending on the pressure change $\Delta P$ is plotted over time t, with, furthermore, a plurality of time intervals $I_0$, $I_1$, $I_2$, $I_3$, . . . being illustrated in an exemplary manner. By way of example, a defined temperature increase $\Delta T$ of the fluid F situated in the volume region 130 is brought about during the time intervals $I_1$, $I_3$, while a defined temperature reduction $\Delta T$ of the fluid F situated in the volume region 130 is brought about in the time interval $I_2$. In the signal curve $S_{\Delta P}$ of FIG. 1b, the assumption is made that the membrane of the pressure transducer 110 is relaxed up to the time to in the interval $I_0$; i.e., it does not experience any deflection on account of an activation or subsequent deactivation of the heating element 150.

Now, the heating element 150 is activated at the time to at the start of the time interval L such that the fluid temperature T increases from the initial temperature $T_0$, i.e., the ambient temperature, for example, to the increased temperature $T_1$, with $T_1=T_0+\Delta T$, at the time $t_1$ at the end of the time interval L. By way of the defined supplied amount of heat by the heating element 150, the temperature change $\Delta T$ can be set to the elevated temperature value $T_1$ within a tolerance range of 50%, 20%, 10% or 1%, for example. In response to the temperature increase $\Delta T$ of the fluid F in the volume region 130, there is a corresponding pressure increase $\Delta P$ of the fluid F in the volume region 130 with a correspondingly increasing signal curve $S_{\Delta P}$. By way of example, an equilibrium state in the form of a local maximum of the signal curve $S_{\Delta P}$ sets in at the time $t_a$. Here, at the time $t_a$, the pressure increase $\Delta P$ in the volume region 130 caused by the temperature increase $\Delta T$ of the fluid F and the fluid exchange occurring through the equalization or ventilation opening 132 between the volume region 130 and the reference volume region 190 obtain an equal value.

The temperature curve T which, starting at the time $t_0$, has a temperature increase $\Delta T$ having an ever smaller grade, now reaches a substantially thermally stable value $T_1$ by the time $t_1$, while the membrane 112 of the pressure transducer 110 relaxes again. Here, the equalization opening 132 between the volume region 130 and the reference volume region 190 is effective as a pressure release valve and substantially equalizes the pressure conditions in the volume region 130 and the reference volume region 190 again such that the pressure curve at the time $t_1$ (e.g., $t_1=5\tau$) in the volume region 130 approximately reaches the initial state $S_0$ again.

By way of example, to a first approximation, the temperature curve in the volume region 130 has a simple exponential function which, in the subsequent intervals, toggles back and forth between the initial temperature $T_0$ and the elevated temperature $T_1$. In the case of a more detailed consideration, the temperature curve can also be assumed to be a plurality of thermal RC functions (exponential functions), which can be coupled to one another.

If the heating element 150 now is deactivated at a time $t_1$, a temperature reduction $\Delta T$ of the fluid F situated in the volume region 130, proceeding from the elevated temperature $T_1$, is brought about following the activated state of the heating element 150.

At the time $t_1$, i.e., at the start of the time interval $I_2$, the heating element 150 is now deactivated such that the fluid temperature T reduces again, proceeding from the temperature $T_1$ at the end of the time interval $I_1$. In response to the reduction in temperature $\Delta T$ of the fluid F in the volume region 130, there is a corresponding reduction in pressure $\Delta P$ of the fluid F in the volume region 130 with a corresponding drop in the signal curve $S_{\Delta P}$. By way of example, an equilibrium state in the form of a local minimum of the signal curve $S_{\Delta P}$ sets in at the time $t_b$. Here, at the time $t_b$, the reduction in pressure $\Delta P$ in the volume region 130 brought about by the reduction in temperature $\Delta T$ of the fluid F and the fluid exchange occurring through the equalization or ventilation opening 132 between the volume region 130 and the reference volume region 190 obtain an equal value.

The temperature curve T which, starting at the time $t_1$, has a temperature decrease $\Delta T$ having an ever smaller drop, now reaches the substantially thermally stable value $T_0$ by the time $t_2$ again, while the membrane 112 of the pressure transducer 110 relaxes again. Here, the equalization opening 132 between the volume region 130 and the reference volume region 190 is effective as a pressure release valve and substantially equalizes the pressure conditions in the volume region 130 and the reference volume region 190 again such that the pressure curve at the time $t_2$ in the volume region 130 reaches the initial state $S_0$ again.

Consequently, there is a deflection of the membrane of the pressure transducer 110 during the time interval $I_2$ between the times $t_1$ and $t_2$ that is in the opposite direction to during the time interval $I_1$.

Now, if the heating element 150 is reactivated at the time $t_2$, a temperature increase $\Delta T$ of the fluid F situated in the volume region 130 is brought about again during the time interval $I_3$ following the deactivated state of the heating element 150. Consequently, the explanations in respect of the signal curve during the interval $I_1$ are equally applicable to the time interval $I_3$ again. Equally, the explanations for the time interval $I_2$ are applicable to a possible time interval $I_4$.

FIG. 1c now illustrates a further exemplary first and second signal curve $S_{\Delta 1P}$ and $S_{\Delta 2P}$, depending on the pressure change $\Delta P$, during different time intervals $I_N$ with N=0, 1, 2, 3, . . . , wherein, according to an exemplary embodiment, odd temperature intervals $I_1$, $I_3$, etc., exhibit, e.g., a state in which the heating element 150, upon activation thereof, brings about a defined temperature increase $\Delta T$ of the fluid F situated in the volume region 130 while, in even time intervals $I_2$, $I_4$, etc., a temperature reduction $\Delta T$ of the fluid F situated in the volume region 130 is brought about upon a deactivation of the heating element 150 following an activated state of the heating element 150.

By way of example, the intervals $I_N$ in FIG. 1c have a duration of $2\tau$ (e.g., between $1\tau$ and $3\tau$), where $\tau$ is the time constant $\tau$ of the exponential function of the falling portion of the first and second signal profile $S_{\Delta 1P}$ and $S_{\Delta 2P}$. Consequently, the assumption can be made that the system has not yet returned to an equalized state at the end of the intervals $I_N$.

FIG. 1c now illustrates two signal curves $S_{A1P}$ and $S_{A2P}$ in an exemplary manner. According to an exemplary embodiment, the first signal curve $S_{1\Delta P}$ represents the signal curve obtained by the pressure transducer or microphone 110, while the second signal curve $S_{2\Delta P}$ represents a setpoint or comparison signal curve in the form of a setpoint functional parameter $F_{SOLL}$ of the pressure transducter 110, which is stored in a storage unit accessible by the processing device 170, for example. By way of example, according to a further exemplary embodiment, the first signal curve $S_{1\Delta P}$ represents the signal curve obtained by the pressure transducer or microphone 110, while the second signal curve $S_{2\Delta P}$ represents the signal curve obtained by a further pressure transducter (not shown in FIG. 1a), which is arranged adjacent to the pressure transducter 110, for example.

The first and second signal curve $S_{1\Delta P}$, $S_{2\Delta P}$, illustrated in FIG. 1c, only substantially differ from the signal curve $S_{\Delta P}$ illustrated in FIG. 1b in that the heating phases with an activated heating element 150 and the cooling phases with a subsequently deactivated heating element 150 are shorter than the decay time (e.g., 5τ) of the signal curve of the system 100 illustrated in FIG. 1a, and substantially do not decay completely. As a result, the test or calibration process can be carried out substantially faster, with, however, lower limit frequency, signal amplitudes and phase information items still being able to be derived from the resultant signal curve $S_{1\Delta P}$, $S_{2\Delta P}$ with heating and cooling intervals, without reaching a thermally stable basic state. By way of example, the intervals $I_N$ in FIG. 1c have a duration of 2τ (e.g., between 1τ and 3τ). However, the duration of the intervals $I_N$ can be chosen essentially as desired, for example, with N≥1, provided that the desired functional parameter still is derivable from the resultant signal curve $S_{\Delta P}$.

Now, the heating element 150 is activated at the time $t_0$ at the start of the time interval $I_1$ such that the fluid temperature T increases from the initial temperature $T_0$, i.e., the ambient temperature, for example, to the increased temperature $T_1$, with $T_1 = T_0 + \Delta T$, at the time $t_1$ at the end of the time interval $I_1$. By way of the defined supplied amount of heat by the heating element 150, the temperature change ΔT can be set to the elevated temperature value $T_1$ within a tolerance range of 50%, 20%, 10% or 1%, for example. In response to the temperature increase ΔT of the fluid F in the volume region 130, there is a corresponding pressure increase ΔP of the fluid F in the volume region 130 with a correspondingly increasing signal curve $S_{A1P}$ or $S_{A2P}$. By way of example, an equilibrium state in the form of a local maximum of the signal curve $S_{\Delta P}$ sets in at the time $t_a$. Here, at the time $t_a$, the pressure increase ΔP in the volume region 130 caused by the temperature increase ΔT of the fluid F and the fluid exchange occurring through the equalization or ventilation opening 132 between the volume region 130 and the reference volume region 190 obtain an equal value.

The temperature curve T which, following the time $t_a$, has a temperature increase ΔT that reduces ever further, now does not yet reach a substantially thermally stable value $T_1$ by the time $t_1$, while the membrane 112 of the pressure transducter 110 relaxes again. Here, the equalization opening 132 between the volume region 130 and the reference volume region 190 is effective as a pressure release valve and only partly equalizes the pressure conditions in the volume region 130 and the reference volume region 190 again such that the pressure curve at the time $t_1$ in the volume region 130 reaches an intermediate state $S_X$.

If the heating element 150 now is deactivated at the time $t_1$, a temperature reduction ΔT of the fluid F situated in the volume region 130 is brought about following the activated state of the heating element 150.

At the time $t_1$ at the start of the time interval $I_2$, the heating element 150 is now deactivated such that the fluid temperature T reduces again, proceeding from the temperature $T_1$ at the end of the time interval $I_1$. In response to the reduction in temperature ΔT of the fluid F in the volume region 130, there is a corresponding reduction in pressure ΔP of the fluid F in the volume region 130 with a corresponding drop in the signal curve $S_{1\Delta P}$, $S_{2\Delta P}$. By way of example, an equilibrium state in the form of a local minimum of the signal curve $S_{1\Delta P}$, $S_{2\Delta P}$ set in at the time $t_b$. Here, at the time $t_b$, the reduction in pressure ΔP in the volume region 130 brought about by the reduction in temperature ΔT of the fluid F and the fluid exchange occurring through the equalization or ventilation opening 132 between the volume region 130 and the reference volume region 190 obtain an equal value.

The temperature curve T which, following the time $t_b$, has a temperature decrease ΔT that reduces ever further, now does not yet reach a thermally stable value by the time $t_2$, while the membrane 112 of the pressure transducer 110 relaxes again. Here, the equalization opening 132 between the volume region 130 and the reference volume region 190 is effective as a pressure release valve and substantially equalizes the pressure conditions in the volume region 130 and the reference volume region 190 again such that the pressure curve at the time $t_2$ in the volume region 130 reaches an intermediate state $S_Y$.

Consequently, there is a deflection of the membrane of the pressure transducer 110 during the time interval $I_2$ between the times $t_1$ and $t_2$ that is in the opposite direction to during the time interval $I_1$.

Now, if the heating element 150 is reactivated at the time $t_2$, a temperature increase ΔT of the fluid F situated in the volume region 130 is brought about again during the time interval $I_3$ following the deactivated state of the heating element 150. Consequently, the explanations in respect of the signal curve $S_{1\Delta P}$, $S_{2\Delta P}$ during the interval $I_1$ are equally applicable to the time interval $I_3$ again. Equally, the explanations for the time interval $I_2$ are applicable to a possible time interval $I_4$.

According to an exemplary embodiment, the processing device 170 now is embodied to ascertain a current operational parameter $F_{IST}$ of the pressure transducer 110 on the basis of the signal curve $S_{\Delta P}$ or $S_{1\Delta P}$, $S_{2\Delta P}$ of the pressure signal $S_P$.

According to exemplary embodiments, the processing device 170 can be further embodied to control, i.e., activate and subsequently deactivate again, the heating element 150 using a control signal $S_{CONTROL}$.

In respect of the signal curves $S_{\Delta P}$ or $S_{1\Delta P}$, $S_{2\Delta P}$, illustrated in FIGS. 1b and 1c, reference is made to the fact that these signal curves should be considered to be exemplary, typical signal curves for an arbitrary differential pressure transducer 110, wherein, however, depending on the specific implementation of the pressure transducer 110, the actual signal profile may deviate in detail from the illustrated signal curves depending on the geometry, the housing, etc., and further boundary parameters. However, the explanations below will show that an array of information items, such as, e.g., limit frequency, signal level or amplitude, phase and/or symmetry, of the signal curve can be determined and evaluated from the actually obtained signal curve $S_{\Delta P}$, $S_{1\Delta P}$, $S_{2\Delta P}$ in order to obtain a current functional parameter of the sound transducer 110 or of the sensor arrangement 100. Below, the obtained signal profile $S_{\Delta P}$ or the obtained signal profiles $S_{1\Delta P}$, $S_{2\Delta P}$ are referred to in general using the general label $S_{\Delta P}$.

According to exemplary embodiments, the processing device 170 now can be further embodied to compare the current functional parameter $F_{IST}$ to a setpoint functional parameter $F_{SOLL}$ of the pressure transducer 110 and obtain a comparison result, and ascertain the calibration information item for the pressure transducer 110 or the sensor arrangement 100 on the basis of the comparison result. Now, the processing device 170 can be embodied further to set or change, on the basis of the ascertained calibration information $F_{CAL}$, an operational or actuation parameter for the pressure transducer and/or a processing parameter for the pressure transducer or for the provided pressure signal $S_P$ with the signal curve $S_{\Delta P}$ depending on the change in pressure $\Delta P$, i.e., undertake an appropriate adaptation of the operational parameter or of the processing parameter on the basis of the evaluated signal curve $S_{\Delta P}$. Thus, for example, a modified operational parameter of the pressure transducer 110 can bring about a modified actuation of the pressure transducer 110 by the processing device. Further, a modified processing parameter of the pressure transducer 110 can bring about modified conditioning of the pressure signal $S_P$ by the processing device.

A current, ascertained functional parameter $F_{IST}$ of the pressure transducer 110 can be determined by means of the limit frequency of the signal curve $S_{\Delta P}$, for example. By way of example, the limit frequency $f_C$ can be ascertained according to $f_C=1/\tau$ from the time constant $\tau$ of the signal curve $S_{\Delta P}$ following an exponential function after the time $t_a$ or $t_b$. Thus, the limit frequency is directly connected to the signal drop of the exponential function (after the time $t_a$ or $t_b$ of the signal curve) and it corresponds to the inverse of the time constant $\tau$. Thus, the quicker the drop in the signal of the signal curve $S_{\Delta P}$, the higher the limit frequency $f_C$ applies, and vice versa. Consequently, a fluid permeability, i.e. a gas or liquid permeability, of one or more equalization openings or ventilation openings 132 of the pressure transducer 110 can be ascertained from the limit frequency $f_C$ as current functional parameter $F_{IST}$. Thus, a reduction in the limit frequency $f_C$ can indicate a reduced fluid permeability of the equalization opening(s) 132 of the pressure transducer 110. Consequently, the limit frequency $f_C$ can be used to capture particles should, for example, particles be situated at the equalization opening 132 of the pressure transducer 110 and have such dimensions that these are able to block or plug the equalization opening of the pressure transducter 110, at least in part or else completely. Inter alia, it is also possible to detect particles in the sound port 104.

According to a further exemplary embodiment, a signal level or signal amplitude in the form of a maximum signal level in terms of absolute value or a maximum signal amplitude $S_{MAX}$ (or $S_{1MAX}$ and $S_{2MAX}$) in terms of absolute value of the signal curve $S_{\Delta P}$ of the pressure signal SP can be ascertained as a current, ascertained functional parameter of the pressure transducer 110 or the sensor arrangement 100. Here, a change in the signal level or in the signal amplitude of the signal curve $S_{\Delta P}$ indicates a change in the mechanical membrane flexibility of the membrane 112 of the pressure transducer 110.

According to exemplary embodiments, the maximum signal level or the maximum signal amplitude $S_{MAX}$ of the signal curve $S_{\Delta P}$ further can be ascertained by the processing device 170, wherein a deviation of the signal level or the signal amplitude (of the maximum signal level or the maximum signal amplitude=peak value) of the signal curves $S_{\Delta P}$ from a setpoint value of the signal level or the signal amplitude may indicate a deviation of the mechanical membrane flexibility of the membrane of the pressure transducer 110 from a corresponding setpoint value for the membrane flexibility.

The maximum signal amplitude $S_{MAX}$ in terms of absolute value (peak value) in the thermo-acoustic stimulation by means of the heating element 150 yields the output signal level of the sound transducer, of a microphone, for example. This maximum signal amplitude (peak value) is a direct indicator for the mechanical membrane flexibility of the membrane of the pressure transducer 110. Consequently, it is possible to set a bias voltage or an electrical bias of the membrane 112 of the pressure transducer 110, for example by the processing device 170, so as to obtain the best possible correspondence of the peak value $S_{MAX}$ of the signal curve $S_{\Delta P}$, measured at $t_a$, $t_b$, with the pre-calibrated comparison or setpoint value, which was obtained within the scope of the factory calibration, for example. Thus, the lower the (maximum) signal amplitude, the stiffer the membrane of the pressure transducer generally applies, wherein, consequently, the bias (bias-voltage), for example, can be set to a higher value by the processing device 170 in order to obtain an electrostatic spring softening effect, for example.

Now, the processing device 170 can be further embodied to provide a value for a modified, electrical bias of the membrane of the pressure transducer 110 as a calibration information item $F_{CAL}$ in order to set or obtain the setpoint value for the mechanical membrane flexibility of the pressure transducter 110, at least approximately (within a tolerance range of 50%, 20%, 10% or 1%), on the basis of the modified electrical bias.

Now, for example, the sensor arrangement 100 can have a plurality of pressure transducers 110, which are arranged in an array, for example. Here, the ascertained, current functional parameter can be a phase information item of the respective signal curve $S_{\Delta P}$, $S_{1\Delta P}$, $S_{2\Delta P}$, . . . of the pressure signal $S_P$, $S_{1P}$, $S_{2P}$, . . . in the plurality of pressure transducers 110. Thus, the ascertained, current functional parameter can be, for example, a phase alignment of the signal curve $S_{\Delta P}$ of the pressure signal $S_P$ in the plurality of pressure transducers 110. Now, the processing device 170 can be further embodied to ascertain a phase alignment of the signal curve $S_{\Delta P}$ of the respective pressure signal $S_P$ of the plurality of pressure transducers, wherein, for example, a different phase alignment of the signal curve $S_{\Delta P}$ of the respective pressure signal $S_P$ indicates an incorrect installation of that pressure transducer which has the different phase alignment in relation to the further pressure transducers. By way of example, an incorrect installation refers to a back-to-front installation (in respect of rear and front side) of a pressure transducer, such as a sound transducer or microphone, for example. Now, the processing device can be embodied further to provide as a calibration information item a value for inverting the pressure signal $S_P$ of the pressure transducer in which an inverted phase alignment of the signal curve $S_{\Delta P}$ of the respective pressure signal $S_P$ is present and was ascertained.

Consequently, the phase alignment of the pressure signal of pressure transducers arranged in an array can be ascertained as ascertained, current functional parameter. By reading the phase of the thermo-acoustic pulse or signal curve $S_{\Delta P}$, wherein a heating pulse of the heating element 150 brings about an increasing signal curve, for example, on account of the temperature increase and cooling or a temperature reduction yields a falling signal curve, the read pressure signal $S_P$ of that pressure transducer or those pressure transducers in which an incorrect phase alignment was determined can be converted or shifted by 180° in order to correct or homogenize the whole read signal.

In a further exemplary embodiment, the sensor arrangement 100 has, once again, a plurality of pressure transducers 110, for example, said pressure transducers, once again, being arranged in an array, for example, wherein the processing device can be further embodied to ascertain a phase offset of the signal curves $S_{AP}$ of the different pressure signals $S_P$ of the plurality of different pressure transducers 110 of the pressure transducer array. Now, the processing device 170 can be further embodied to provide as a calibration information item a phase adaptation of one or more pressure signals $S_P$ of the pressure transducer in the pressure transducer array, in which a phase offset of the signal curves $S_{AP}$ of the pressure signals $S_P$, which exceeds a limit value, was ascertained.

Consequently, according to exemplary embodiments, phase fine tuning is possible in the array of pressure transducers 110, for example by virtue of, further, fine tuning of the phase as a phase shift being carried out in steps of less than or equal to 180°, for example 0.5°, 1°, 2°, 5°, 10°, etc. This phase fine tuning of the sound transducers 110 arranged in an array can be carried out, for example, after the ascertainment and adaptation of the maximum signal amplitude and/or the phase alignment of individual sound transducers 110 in the array (see above), already described above, was carried out. Using this procedure, it is possible, for example, to adapt or correct sound propagation, wherein, further, read coordination is achieved and, consequently, the read quality of the sound transducers 110 arranged in an array can be increased.

According to exemplary embodiments, the sensor arrangement 100 can have a plurality of pressure transducers 110 that are arranged in an array. Here, the ascertained, current functional parameter of the individual pressure transducers 110 also can be used to determine the functionality of the individual pressure transducers 110 as a matter of principle, i.e., ascertain whether individual pressure transducers of the array are defective. By way of example, should it be determined that individual pressure transducers of the array are defective, it is possible to deactivate these, i.e., the output signal thereof is no longer taken into account, for example by the processing device 170.

Further, a symmetry consideration between the resultant signal curve during a temperature increase and, subsequently, during a temperature reduction, i.e., the symmetry between a hot pulse and cool pulse can be ascertained as further ascertained, current functional parameter $F_{IST}$ of the pressure transducer 110.

Consequently, according to an exemplary embodiment, an ascertained functional parameter of the pressure transducer 110 can be an ambient condition or a change in same. By way of example, an ambient condition is an ambient temperature, an ambient atmospheric pressure (ambient air pressure), an ambient humidity and/or an ambient gas component, such as, for example, a CO component, NOx component, etc., in the ambient atmosphere. Now, the processing device 170 can be embodied further to ascertain the calibration information item for the pressure transducer 110 or the sensor arrangement 100 on the basis of a comparison of a portion of the signal curve $S_{AP}$ of the pressure signal $S_P$ during a heating of the fluid F in the volume region 130 and a second portion of the signal curve $S_{AP}$ of the pressure signal $S_P$ during a cooling of the fluid F in the volume region 130. Thus, the processing device 170 can be embodied further to ascertain the calibration information item on the basis of a symmetry consideration between the first and the second portion of the signal curve $S_{AP}$ of the pressure signal $S_P$.

When considering the symmetry between a hot pulse and cool pulse, it is possible to take account of the fact that, theoretically, the pressure signal curve during the temperature increase, i.e., during a heating thermo-acoustic pulse, and the pressure signal curve during the temperature reduction, i.e., during a cool pulse, should have substantially the same form. However, since different physical conditions, such as thermal couplings, thermal sources and thermal sinks (heatsinks), for example, or else different control parameters, i.e., different thermal boundary conditions, now are present, the two signal curves in the form of the heating and cooling signal curve are not exactly the same but nevertheless very similar. Thus, for example, a changing difference between the two signal curves, i.e., the heating pressure signal curve and the cooling pressure signal curve, can be assumed to be, and taken into account as, an indicator for changing ambient conditions, for example, a changing ambient temperature, etc.

As already presented above, the sensor arrangement 100 can be a photoacoustic sensor arrangement, a pressure sensor arrangement or a differential pressure sensor arrangement having a MEMS pressure sensor or a MEMS differential pressure sensor, or else a sound transducer arrangement or microphone arrangement.

FIGS. 2a-d now show a basic illustration of the sensor arrangement 100 with a pressure transducer 110 embodied as a sound transducer, in different operational states A to D for ascertaining the signal curve $S_P$ of the pressure signal $S_P$ depending on the pressure change ΔP.

As illustrated in FIGS. 2a-d, the sensor arrangement 100 is embodied as a sound transducer or microphone arrangement, for example, wherein the pressure transducer 110 is embodied as a microphone or MEMS microphone 110. The configuration of the sensor arrangement 100 should merely be considered to be exemplary since substantially any pressure transducer implementation can be used in the present concept. Consequently, the illustration of the sensor arrangement 100 as a microphone arrangement with a MEMS microphone 110 as a pressure transducer should only be considered to be exemplary and serves to elucidate the present concept for testing or calibrating the sensor arrangement 100.

As illustrated in FIGS. 2a-d, the sensor arrangement or microphone arrangement 100 has a housing 102, for example with a housing wall (lid) 102-1 and a carrier (PCB=printed circuit board) 102-2 and with a sound opening or a sound port 104, wherein the microphone no is arranged adjacent to the sound port 104 within the housing 102. Further, the heating element 150 and an ASIC, which can be effective as the processing device 170 of FIG. 1, for example, are arranged within the housing 102. However, it is further also possible to use an external processing device (not shown in FIGS. 2a-d) according to exemplary embodiments. The volume region 130 having the fluid F is formed by the internal volume 130, i.e., the back volume of the microphone arrangement 100, lying downstream of the microphone 110 in the "sound propagation direction". Consequently, the fluid F is the gas of the ambient atmosphere or the ambient air, for example. In the microphone arrangement 100 of FIGS. 2a-d, the microphone 110 consequently has a fluid connection to the volume region 130 having the fluid F, i.e., the back volume, wherein the sound transducer 110 is embodied to output the pressure signal $S_P$ with the signal curve $S_{\Delta P}$ depending on the pressure change $\Delta P$ in response to a pressure change $\Delta P$ in the volume region 130. The heating element 150, which is illustrated as an independent element in FIGS. 2a-d, now is embodied to bring about the defined temperature change $\Delta T$ of the fluid F situated in the volume region 130, wherein the temperature change $\Delta T$ of the fluid F brings about a pressure change $\Delta P$ in the volume region 130. According to exemplary embodiments, the heating element 150 also can be embodied as part of the ASIC 170. Further, an equalization opening or ventilation opening 132 can be provided in the membrane 112 between the volume region 130 and the reference volume region 190.

The processing device 170 i.e., the illustrated ASIC, for example, now is embodied to ascertain a calibration information item for the sound transducer 110 on the basis of the signal curve $S_{\Delta P}$ of the pressure signal $S_P$, which is obtained during the temperature change $\Delta T$ in the volume region 130 brought about by the heating element 150.

Now, for example, the sound transducer 110 is embodied to ascertain a pressure change $\Delta P$ in the volume region 130 (back volume of the microphone) in relation to a reference pressure, e.g., atmospheric pressure, in a reference volume region 190, i.e., the ambient region or front volume region. The exemplary embodiments of the sensor arrangement 100 with the pressure transducer 110, illustrated on the basis of FIGS. 1a-c, are consequently equally applicable to the microphone arrangement wo with the sound transducer 110 illustrated in FIGS. 2a-d.

As illustrated in FIG. 2a, the heating element 150 in operational state A is in a deactivated state, prior to an activated state of same, for example, and so the microphone membrane is relaxed and in an "initial position". Consequently, the microphone 110 only captures the sound, incident through the sound port 104, from the surroundings of the microphone arrangement 100. The microphone arrangement 100 illustrated in FIG. 2a is consequently in the interval $I_0$ of FIG. 1b or 1c.

As illustrated in FIG. 2b as operational state B, the heating element 150 is activated at the time to (see also FIG. 1b or 1c) in order to bring about a defined temperature increase $\Delta T$ of the fluid F situated in the volume region 130. The microphone arrangement 100 illustrated in FIG. 2b consequently is within the interval $I_1$ of FIG. 1b or 1c at the time $t_a$, for example with a maximum deflection of the membrane of the microphone 110.

As illustrated in FIG. 2c in the case of the operational state C, the temperature T now reaches a thermally stable value $T_1$ during the interval $I_1$, just before or at the time $t_1$ of FIG. 1b or 1c. On account of the ventilation or equalization opening(s) of the microphone 110, the microphone membrane transitions back into a relaxed state (see FIG. 1b) or into an at least partly relaxed state (see FIG. 1c) since the ventilation opening 132 of the membrane 112 of the microphone no is effective as a pressure release valve and it equalizes the internal pressure in the back volume 130 with the external pressure of the ambient atmosphere (see FIG. 1b or 1c).

With reference to the typical signal curves of FIGS. 1b and 1c, reference is made to the fact that this thermally stable value in the back volume 130 of the microphone no can be reached with a heater 150 that remains activated, i.e., the thermal energy output by the heater 150 into the internal volume 130 of the microphone no and the further heating and pressure increase $\Delta P$ in the internal volume of the microphone, resulting therefrom, are more than compensated by the gas interchange by way of the ventilation opening 132 of the microphone 110, and so the initial "positive pressure" in the internal volume 130 of the microphone decreases despite the heater 150 remaining activated, as illustrated in the operational state C of FIG. 2c.

If the fluid interchange is less than the minimum recorded pressure change $\Delta P$ of the microphone 119, i.e., if the membrane 112 no longer moves, and if the temperature T tends to be interchanged via the structure mechanism of housing wall (lid) 102-1 or else PCB (carrier) 102-2, then the operational state C is reached, in which an equilibrium sets-in between the internal pressure in the volume region 130 and the external pressure in the outer volume 190. Thus, there no longer is any significant pressure interchange.

FIG. 2d now illustrates the operational state D of the microphone arrangement 100, in which the heating element 150 is deactivated at the time $t_1$ following the activated state during the interval $I_1$ in order now, during the interval $I_2$, to bring about a temperature reduction of the fluid F situated in the volume region 130 (see FIG. 1b or 1c). After the heating element 150 is deactivated, the microphone arrangement 100, i.e., the entire system, starts to cool down again, wherein the drop in temperature in the back volume 130 causes the fluid F in the form of gas or air situated therein to contract again and causes the microphone membrane 112 to be drawn inward in the direction of the back volume or a measurement volume 130.

Since the temperature T now, once again, reaches a thermally stable value at the end of the interval $I_2$ near or at the time $t_2$, the microphone membrane 112 relaxes again, with the equalization or ventilation opening 132 of the microphone membrane 112 once again being effective as a pressure release valve in the other direction and equalizing the internal pressure P in the back volume 130 with the external pressure of the surroundings 190 such that the state of the microphone arrangement 100 of FIG. 2a is reached once again.

A current functional parameter $F_{IST}$ of the microphone no now can be ascertained on the basis of the obtained signal curve $S_{\Delta P}$ of the pressure signal $S_P$, for example by means of the processing device 170 (ASIC), wherein reference in this respect is made to the explanations relating to ascertaining the current functional parameter of FIGS. 1a-c, which can be equally applied here.

By way of example, a current, ascertained functional parameter $F_{IST}$ of the pressure transducer 110 can be determined by means of the limit frequency of the signal curve $S_{\Delta P}$. According to a further exemplary embodiment, a signal level or signal amplitude in the form of a maximum signal level in terms of absolute value or a maximum signal amplitude $S_{MAX}$ in terms of absolute value of the signal curve $S_{\Delta P}$ of the pressure signal $S_P$ can be ascertained as a current, ascertained functional parameter of the pressure transducer 110 or the sensor arrangement 100. Now, for example, the sensor arrangement 100 can have a plurality of pressure transducers 110, which are arranged in an array, for example. Here, the ascertained, current functional parameter can be a phase information item of the respective signal curve $S_{\Delta P}$ of the pressure signal $S_P$ in the plurality of pressure transducers 110. In a further exemplary embodiment, the sensor arrangement 100 has, once again, a plurality of pressure transducers 110, for example, said pressure transducers, once again, being arranged in an array, for example, wherein the processing device can be further embodied to ascertain a phase offset of the signal curves $S_{\Delta P}$ of the different pressure signals $S_P$ of the plurality of different pressure transducers no of the pressure transducer array. The ascertained, current functional parameter of the individual pressure transducers 110 also can be used to determine the functionality of the individual pressure transducers 110 as a matter of principle, i.e., ascertain whether individual pressure transducers of the array are defective. Further, a symmetry consideration between the resultant signal curve during a temperature increase and, subsequently, during a temperature reduction, i.e., the symmetry between a hot pulse and cool pulse can be ascertained as further ascertained, current functional parameter $F_{IST}$ of the pressure transducer 110. Consequently, according to an exemplary embodiment, an ascertained functional parameter of the pressure transducer 110 can be an ambient condition or a change in same. By way of example, an ambient condition is an ambient temperature, an ambient atmospheric pressure (ambient air pressure), an ambient humidity and/or an ambient gas component, such as, for example, a CO component, NOx component, etc., in the ambient atmosphere.

Further, the additional boundary conditions, such as, for example, humidity, ambient air pressure, etc., can be taken into account when evaluating the microphone signal. By way of example, this can be carried out if the heat capacity of the system 100 changes considerably. In principle, these parameters or boundary conditions are only incorporated into the exponential function of the thermals or the temperature curve; the latter then becomes slightly faster (steeper) or slower (flatter). If the measurement intervals are selected to be sufficiently long (e.g., longer than the worst-case scenario), then these effects should drop out again, i.e., have a negligible influence. By way of example, this is the case if these effects, already as per definition, lie far below the corner frequency (lower limit frequency $f_C$) of the microphone and are therefore very much damped, i.e., below the SNR (signal-to-noise ratio) of the microphone 110.

FIGS. 3a-d now show a further basic illustration of the sensor arrangement or microphone arrangement 100 with a plurality of (e.g., two) sound transducers or microphones 110, 110-1 illustrated in different operational states, for example to carry out a phase offset measurement and correction between the plurality of microphones 110, 110-1.

As illustrated in FIGS. 3a-d, the microphone arrangement 100 has, in addition to the sound transducer 110, a further sound transducer 110-1 with a membrane 112-1 and an equalization opening 132-1, wherein the further sound transducer 110-1 is arranged adjacent to a further sound port 104-1 in the housing 102 of the microphone arrangement boo. Otherwise, the microphone arrangement 100 of FIGS. 3a-d has the same basic construction as the microphone arrangement 100 of FIGS. 2a-d.

Figure 3A:
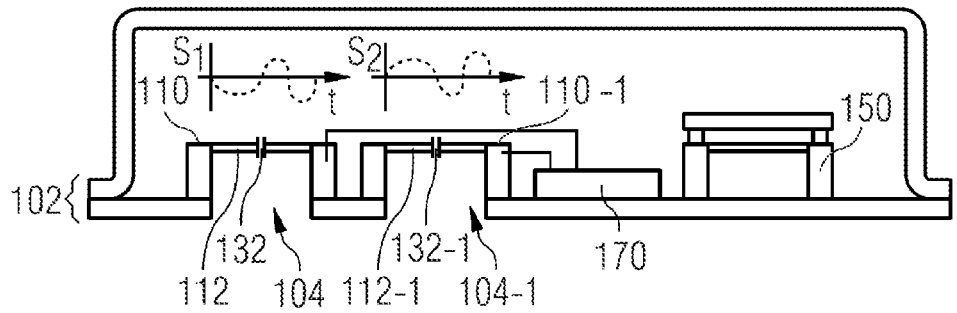
FIGS. 3a-d show a basic illustration of the sensor arrangement having a plurality of sound transducers in different operational states for ascertaining the signal curve of the pressure signal in the case of a temperature change, caused by the heating element, in the volume region according to an exemplary embodiment.

As illustrated in principle in FIG. 3a, both microphones 110, 110-1 are electrically connected to the evaluation device 170 for reading the respective signal curves. As illustrated further in FIG. 3a, both microphones 110, 110-1 are arranged, e.g., immediately adjacent to one another within the housing 102 such that both microphones 110, 110-1 are substantially exposed to the same incident sound or sound pressure. As illustrated further in FIG. 3a in an exemplary manner, the first and the second microphone 110, 110-1, however, supply phase-shifted electric signals $S_1$, $S_2$, e.g., 180° phase-shifted electric signals, to the processing device 170. Such a phase offset of 180°, for example, may arise if one of the two microphones 110 or 110-1 was incorrectly installed, i.e., attached with the front and back side thereof interchanged to the housing 102.

Figure 3B:
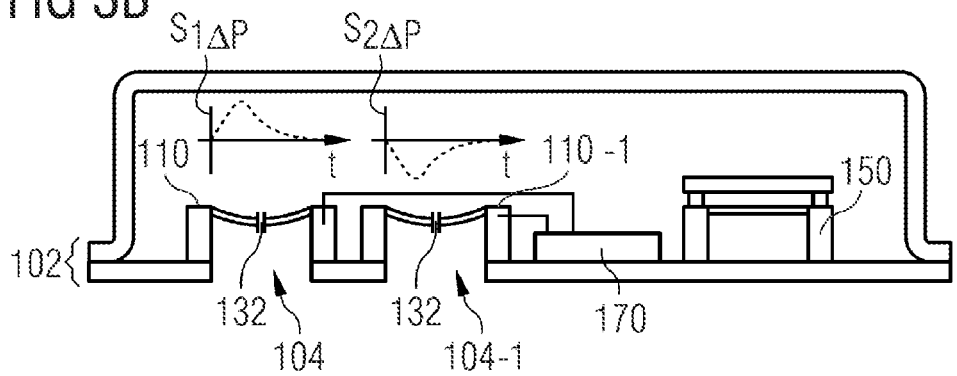

As illustrated in FIG. 3b in principle, the processing device 170 can capture the corresponding, respective signal curve $S_{1\Delta P}$, $S_{2\Delta P}$ of the first and second microphone 110, 110-1, which are exposed to substantially the same pressure and temperature change $\Delta P$ and $\Delta T$ of the fluid F in the volume region 130 as soon as the heating element 150 brings about a defined temperature change $\Delta T$ of the fluid F situated in the volume region 130 and consequently brings about a corresponding pressure change $\Delta P$ in the volume region 130. Consequently, the processing device 170 can ascertain as current functional parameter a phase alignment of the respective signal curve $S_{1\Delta P}$, $S_{2\Delta P}$ of the pressure signal in the two microphones 110, 110-1, as illustrated in FIG. 3b. Should the processing device 170 capture a phase difference of 180°, for example, the processing device 170 now can be embodied further to bring about a phase adaptation or a phase inversion of the signal curve, out of phase, of the pressure signal of, e.g., the incorrectly installed microphone 110-1 as a calibration information item.

Figure 3C:
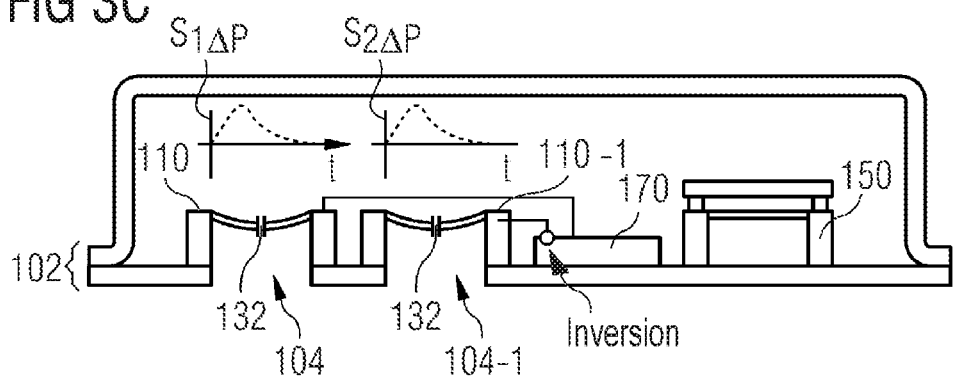

As illustrated in FIG. 3c, the phase correction can be effected by inverting the pressure signal $S_{2P}$ of the second microphone 110-1 that is 180° out of phase.

Figure 3D:
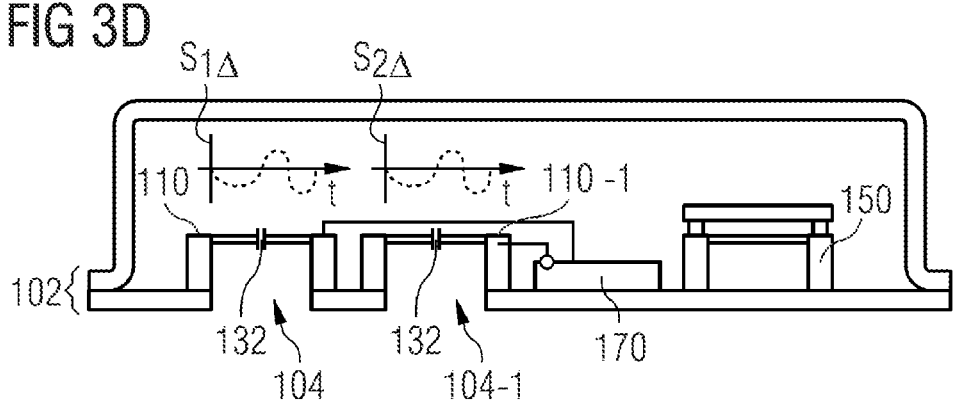

As illustrated in FIG. 3d and the associated output signals $S_1$, $S_2$ of the two microphones 110, 110-1, the two microphones 110, 110-1 are now in phase, i.e., the acoustic capture equals the electric capture.

Exemplary embodiments of a method 200 for testing a sensor arrangement 100 are now described below on the basis of FIG. 4. In the method 200, reference is made, once again, to the sensor arrangement 100, as was described on the basis of FIGS. 1a-c, 2a-d and 3a-d.

In the method 200, a defined temperature increase $\Delta T$ of a fluid F situated in a volume region 130 is initially produced in a step 210, wherein the temperature change $\Delta T$ of the fluid F brings about a pressure change $\Delta P$ in the volume region 130.

Now, the pressure change $\Delta P$ in the volume region 130 by a pressure transducer 110 is captured in a step 220, wherein the pressure transducer 110 is in fluid connection with the volume region 130 having the fluid F.

A pressure signal $S_P$ with a signal curve $S_{\Delta P}$ depending on the pressure change $\Delta P$ is output in a step 230 in response to the pressure change $\Delta P$ in the volume region 130.

A calibration information item $I_{CAL}$ for the pressure transducer 110 is ascertained in a step 240 on the basis of the signal curve $S_{\Delta P}$ of the pressure signal $S_P$, wherein the signal curve $S_{\Delta P}$ is obtained during the temperature change $\Delta T$ in the volume region 130.

By way of example, the pressure change $\Delta P$ in the volume region 130 is captured in relation to a reference pressure $P_{REF}$ in a reference volume region 190 in the step 220 of capturing the pressure change $\Delta P$ in order to output the pressure signal $S_P$ with the signal curve $S_{\Delta P}$ depending on the pressure change $\Delta P$.

The step 210 of producing a defined temperature change now can be further carried out, for example, by virtue of the heating element 150 being initially activated in order to bring about a defined temperature increase of the fluid F situated in the volume region 130 and the heating element 150 then subsequently being deactivated following the activated state of same in order to bring about a defined temperature reduction of the fluid F situated in the volume region 130.

In step 240 of ascertaining the calibration information item, a current functional parameter $F_{IST}$ of the pressure transducer 110 further can be ascertained on the basis of the signal curve $S_{\Delta P}$ of the pressure signal $S_P$, whereupon the current functional parameter $F_{IST}$ can be compared to a setpoint functional parameter $F_{SOLL}$ of the pressure transducer 110 in order to obtain a comparison result, and wherein, further, the calibration information item for the pressure transducer 110 can be ascertained on the basis of the comparison result.

Further, in an optional step 250, an operational parameter or processing parameter can be changed for the pressure transducer 110 on the basis of the calibration information item, wherein a modified operational parameter of the pressure transducer 110 brings about a modified actuation of the pressure transducer 110 and wherein a modified processing parameter of the pressure transducer 110 brings about modified conditioning and/or processing of the pressure signal $S_P$.

According to exemplary embodiments, the processing device 170 of FIG. 1a-c, 2a-d or 3a-d, or else a further processing device (not shown in the figures), can be used to carry out the method described on the basis of FIG. 4 such that the aspects described on the basis of the processing device 170 also constitute a description of the corresponding method, and so the functions and properties described on the basis of the processing device 170 should also be understood to be a corresponding method step or a feature of a method step.

A flowchart or a block diagram for testing or calibrating a sensor arrangement 100 is now described below on the basis of FIG. 5, with reference being made to structural elements and functional properties of the sensor arrangement 100 described on the basis of FIGS. 1a-b, 2a-d, 3a-d and method steps described on the basis of FIG. 4.

As illustrated in FIG. 5a, the sensor arrangement or microphone arrangement 100 with the microphone 110 is initially provided. By way of example, the microphone is used to capture the sound signal incident on the microphone no through the access port 104, with the processing device 170 being embodied, for example, to evaluate and condition this sound signal. Thus, an acoustic measurement of the sound pressure level (SPL) of the surroundings is carried out in FIG. 5a.

As illustrated in FIG. 5b, a defined temperature increase of the fluid F situated in the volume region 130 (back volume) is now brought about by activating the heating element 150 (see step 210 of FIG. 4). Thus, a heating or hot pulse is produced by means of the heating element 150, said pulse producing a pressure change in the volume region 130 that, for example, is greater than the current ambient sound pressure level SPL (sound pressure level). In order to obtain a sufficient signal-to-noise ratio (SNR parameter), the pressure change ΔP in the volume region 130 caused by the temperature change ΔT can be greater than the current sound pressure level by at least approximately 6 $dB_{SPL}$ (a factor of 2). By way of example, this can be obtained by a temperature increase ΔT of the fluid F in the volume region 130 of 1 to 2 Kelvin, depending on the external volume and volume dimension.

These values should only be assumed to be exemplary and can vary depending on the actual configuration of the sensor arrangement 100.

FIG. 5c illustrates that the pressure change in the volume region 130 caused by the temperature increase is captured and the pressure signal $S_P$ with the signal curve $S_{\Delta P}$ is output (see steps 220 and 230 of FIG. 4). Thus, during the acoustic measurement of FIG. 5c, the thermo-acoustic pulse produced by the heating element 150 is captured (see steps 220 and 230 of FIG. 4).

In FIG. 5d, a temperature reduction of the fluid F situated in the volume region is brought about by deactivating the heating element 150 following an activated state. Thus, a cool pulse is produced by deactivating the heating element 150, said cool pulse producing a pressure reduction in the volume region 130 by cooling the fluid F.

In FIG. 5e, functional parameters and/or calibration information items of the pressure transducer 110 are ascertained, e.g., for tuning the same, on the basis of an acoustic measurement using the microphone 110.

In FIG. 5f, an operational parameter (actuation parameter) and/or a processing parameter for the pressure transducer 110 is ascertained or adapted by the processing device (ASIC) 170 on the basis of the ascertained calibration information items. Here, a modified operational parameter of the pressure transducer 110 brings about a modified actuation of the pressure transducer, while a modified processing parameter of the pressure transducer brings about modified conditioning or processing of the pressure signal. Thus, in FIG. 5f, the system in the form of the sensor arrangement 100 is set or calibrated according to the extracted or ascertained functional parameters by means of the processing device or the ASIC 170 (see optional step 250 in FIG. 4).

Optionally, the measurement can be effected in a loop; i.e., the test or calibration process either can be terminated here or it can be repeated and run through again accordingly at FIG. 5a as an initial point.

Now, a few application options and further aspects of the present concept of the present sensor arrangement 100 and of the concept for testing and calibrating the sensor arrangement 100 are discussed in general terms below.

As already presented above, the present concept is applicable, for example, to microphone arrangements 100 or else to photoacoustic sensors (gas measurement systems) 100 using a microphone 110.

Photoacoustic sensors (PAS sensors) use the photoacoustic effect, in which electromagnetic radiation is absorbed by molecules, with the pressure variations resulting from the absorption being detected directly by means of the pressure transducer 110. Here, different phases can be considered during the production of the photoacoustic signal. Initially, the electromagnetic radiation is absorbed by the molecules at very specific wavelengths. The resultant increase in energy or increase in temperature is shown by a faster movement of the molecules, leading to a pressure increase in the system. In a closed volume, the pressure change or pressure increase is captured by a microphone, for example, and so the absorbed electromagnetic energy is converted into sound. A source of electromagnetic energy with a broadband emission produces a maximum photoacoustic signal in a measurement volume. The emitted electromagnetic radiation is modulated and coupled into the photoacoustic cell filled with the target gas by way of a defined measurement distance. The microphone 110 in the photoacoustic cell 100 detects the pressure variation that arises by the modulated radiation influx. If molecules of the target gas are situated in the measurement distance, some of the electromagnetic radiation is already absorbed in the measurement distance. As a result, there is a reduction in the signal in the photoacoustic cell. By contrast, if no target gas is in the measurement chamber, the pressure signal measured there is at a maximum. The pressure signal consequently provides a statement about the size of the portion of the target gas in the measurement chamber.

Thus, for example, the present concept can be applied to a photoacoustic gas sensor (PAS sensor) 100 and can be considered to be a general microphone calibration concept. Since any thermal source that is able to change the gas temperature during the measurement can be used as a heating element 150, use can also be made of an infrared (IR) emitter, as is used in PAS thermal sources, according to exemplary embodiments.

Now, the processing device 170 can ascertain a current functional parameter $F_{IST}$ of the pressure transducer 110 on the basis of the signal curve $S_{\Delta P}$ of the pressure signal $S_P$ or a calibration information item for the pressure transducer 110. Thus, an operational parameter or processing parameter for the pressure transducer 110 can be modified on the basis of the calibration information item, wherein a modified operational parameter of the pressure transducer 110 brings about a modified actuation of the pressure transducer and wherein a modified processing parameter of the pressure transducer 110 brings about a modified conditioning and/or processing of the pressure signal $S_P$.

According to exemplary embodiments, the processing device 170 of FIG. 1*a-c*, 2*a-d* or 3*a-d*, or else a further processing device (not shown in the figures), can be used to carry out the method described on the basis of FIGS. 4 and 5.

Since the described test or calibration concept does not use any additional external components and an internal sound source is used as a heat source, the present concept can be used during a calibration in practical use (in the field calibration). Exemplary embodiments further describe a possible factory-side or the customer-side acoustic calibration routine, which is used as an in situ measurement.

Exemplary embodiments of the sensor arrangement 100 or of the method 200 for testing or calibrating the sensor arrangement 100 are applicable without much outlay to existing gas sensor concepts, wherein the test and calibration process, in particular, can be significantly reduced in relation to the previous procedures in the case of PAS gas sensors.

Exemplary embodiments of the present description are focused on an acoustic test concept and a corresponding microphone calibration, for example. Since most PAS sensors already use thermal sources to produce the IR light thereof, precisely this type of heat source, for example, can be used according to exemplary embodiments to produce an acoustic pressure change in the volume region 130 in order to determine the microphone sensitivity and, further, additional system properties. One requirement consists in a known temperature at the heat source, which is the result of the electric or thermal characterization of the factory or customer test case, for example. No additional external or internal sound source is required with the present concept, with the internal thermal source being used as a heating element (as a thermo-acoustic transducer), wherein the temperature change caused by the heating element is captured by the pressure transducer or microphone 110. Consequently, a heating resistor, a closing resistance $R_{ON}$ of a transistor or a component that emits electric power losses by heating the same can be used as a heat source.

The present concept for testing and calibrating a sensor arrangement can be used by the customer for an in situ calibration of the pressure transducer or microphone in a photoacoustic gas sensor. The acoustic calibration can also be carried out in advance on the factory-side or during the run-time during automatic calibration processes for fine-tuning at the customer. The entire signal processing can be handled by the processing device (ASIC) 170 with raw data and/or with post-processed data.

Thus, exemplary embodiments describe an acoustic in situ calibration without external acoustic excitations. The acoustic excitations are produced internally by means of a heating source, i.e., the heating element 150, and thermo-acoustic coupling. The thermal source, i.e., the heater, resistor, component with electrical power losses, etc., couples the thermal energy into the measurement chamber gas, i.e., the fluid in the volume region 130, leading to a pressure increase, i.e., heating, or a pressure decrease, i.e., cooling. The transient behavior now indicates pressure transducer or microphone characteristics, such as amplitude or limit frequency, for example. The limit frequency can also be used taking account of the ventilation or equalization concept to distinguish between a tight and a non-tight housing.

According to a first aspect, a sensor arrangement 100 can comprise the following features: a pressure transducer 110 with a fluid connection to a volume region 130 having a fluid F, wherein the pressure transducer 110 is embodied, in response to a pressure change $\Delta P$ in the volume region 130, to output a pressure signal $S_P$ with a signal curve $S_{\Delta P}$ depending on the pressure change $\Delta P$, a heating element 150 that is embodied to bring about a defined temperature change $\Delta T$ of the fluid F situated in the volume region, wherein a temperature change $\Delta T$ of the fluid F brings about a pressure change $\Delta P$ in the volume region 130, and a processing device 170 that is embodied to ascertain a current functional parameter $F_{IST}$ of the pressure transducer 110 on the basis of the signal curve $S_{\Delta P}$ of the pressure signal $S_P$ obtained in the volume region 130 in the case of a temperature change $\Delta T$ brought about by the heating element 150.

According to a second aspect with reference to the first aspect, the pressure transducer 110 can be embodied to capture the pressure change $\Delta P$ in the volume region 130 in relation to a reference pressure $P_{REF}$ in a reference volume region 190.

According to a third aspect with reference to the first aspect, the pressure transducer 110 can have a differential pressure sensor or an absolute pressure sensor.

According to a fourth aspect with reference to the first aspect, the heating element 150, upon activation, can be embodied to bring about a defined temperature increase $\Delta T$ of the fluid F situated in the volume region 130.

According to a fifth aspect with reference to the first aspect, the heating element 150, upon deactivation following an activated state of same, can be further embodied to bring about a temperature reduction $\Delta T$ of the fluid F situated in the volume region 130.

According to a sixth aspect with reference to the first aspect, the processing device 170 can be further embodied to ascertain a calibration information item $I_{CAL}$ for the pressure transducer 110 on the basis of the current functional parameter $F_{IST}$ of the pressure transducer 110.

According to a seventh aspect with reference to the sixth aspect, the processing device 170 can be further embodied to compare the current functional parameter $F_{IST}$ to a setpoint functional parameter $F_{SOLL}$ of the pressure transducer 110 and obtain a comparison result, and to ascertain the calibration information item $I_{CALL}$, for the pressure transducer 110 on the basis of the comparison result.

According to an eighth aspect with reference to the first aspect, the processing device 170 can be further embodied to change an operational parameter and/or a processing parameter for the pressure transducer 110 on the basis of the calibration information item $I_{CAL}$.

According to a ninth aspect with reference to the eighth aspect, the processing device 170 can be embodied to bring about a modified actuation of the pressure transducer 110 on the basis of the modified operational parameters of the pressure transducer 110.

According to a tenth aspect with reference to the eighth aspect, the processing device 170 can be embodied to bring about modified conditioning or processing of the pressure single SP on the basis of the modified processing parameter of the pressure transducer 110.

According to an eleventh aspect with reference to the sixth aspect, the current functional parameter can be a fluid permeability of one or more equalization openings of the pressure transducer 110.

According to a twelfth aspect with reference to the eleventh aspect, the processing device 170 can be further embodied to ascertain a lower limit frequency $f_C$ of the signal curve $S_{\Delta P}$, wherein a reduction in the lower limit frequency indicates a reduced fluid permeability of one or more equalization openings of the pressure transducer 110.

According to a thirteenth aspect with reference to the sixth aspect, the current functional parameter can be based on a mechanical membrane flexibility of a membrane of the pressure transducer 110.

According to a fourteenth aspect with reference to the thirteenth aspect, the processing device 170 can be further embodied to ascertain a maximum signal amplitude of the signal curve $S_{\Delta P}$, wherein a change in the maximum signal amplitude of the signal curve $S_{\Delta P}$ indicates a change in the mechanical membrane flexibility of the membrane of the pressure transducer 110.

According to a fifteenth aspect with reference to the thirteenth aspect, the processing device 170 can be further embodied to ascertain a maximum signal amplitude of the signal curve $S_{\Delta P}$, wherein a deviation of the maximum signal amplitude of the signal curve $S_{\Delta P}$ from a setpoint value indicates a deviation of the mechanical membrane flexibility of the membrane of the pressure transducer from the setpoint value.

According to a sixteenth aspect with reference to the thirteenth aspect, the processing device 170 can be embodied to provide a value for a modified, electrical bias of the membrane of the pressure transducer as the calibration information item $I_{CAL}$ in order to obtain, at least approximately, the setpoint value for the mechanical membrane flexibility of the pressure transducer 110 on the basis of the modified, electrical bias.

According to a seventeenth aspect with reference to the sixth aspect, the sensor arrangement 100 can have a plurality of pressure transducers 110, wherein the current functional parameter is a phase information item of the respective signal curve $S_{\Delta P}$ of the pressure signal $S_P$ in the plurality of pressure transducers 110.

According to an eighteenth aspect with reference to the seventeenth aspect, the current functional parameter can be a phase alignment of the signal curve $S_{\Delta P}$ of the pressure signal in the plurality of pressure transducers.

According to a nineteenth aspect with reference to the seventeenth aspect, the processing device 170 can be further embodied to ascertain a phase alignment of the signal curve $S_{\Delta P}$ of the respective pressure signal of the plurality of pressure transducers 110, wherein a different phase alignment of the signal curve $S_{\Delta P}$ of the respective pressure signal $S_P$ indicates an incorrect installation of the pressure transducer 110, for example.

According to a twentieth aspect with reference to the nineteenth aspect, the processing device 170 can be further embodied to provide a value for an inversion of the pressure signal $S_P$ of the pressure transducers 110 in which an inverted phase alignment of the signal curve $S_{\Delta P}$ of the respective pressure signal $S_P$ is present, as the calibration information item $I_{CAL}$.

According to a twenty-first aspect with reference to the seventeenth aspect, the sensor arrangement can have a plurality of pressure transducers that are arranged in a pressure transducer array, wherein the processing device 170 is further embodied to ascertain a phase offset of the signal curves $S_{\Delta P}$ of the pressure signals $S_P$ from a plurality of different pressure transducers 110, 110-1 of the pressure transducer array.

According to a twenty-second aspect with reference to the twenty-first aspect, the processing device 170 can be further embodied to provide a phase adaptation of one or more pressure signals $S_P$ of the pressure transducers in the pressure transducer array as a calibration information item $I_{CAL}$.

According to a twenty-third aspect with reference to the sixth aspect, the current functional parameter can be an ambient condition.

According to a twenty-fourth aspect with reference to the twenty-third aspect, the ambient condition can be an ambient temperature, an ambient air pressure, an ambient humidity and/or an ambient gas component in the ambient atmosphere.

According to a twenty-fifth aspect with reference to the twenty-third aspect, the processing device 170 can be further embodied to ascertain the calibration information item $I_{CAL}$ on the basis of a comparison between a first signal curve of the pressure signal in the case of a heating of the fluid F in the volume region 130 and a second signal curve of the pressure signal in the case of a cooling of the fluid F in the volume region.

According to a twenty-sixth aspect with reference to the twenty-fifth aspect, the processing device 170 can be further embodied to ascertain the calibration information item $I_{CAL}$ on the basis of a symmetry consideration between the first and the second signal curve of the pressure signal.

According to a twenty-seventh aspect with reference to the first aspect, the sensor arrangement 100 can be a photoacoustic sensor arrangement.

According to a twenty-eighth aspect with reference to the first aspect, the sensor arrangement 100 can be a pressure sensor arrangement with an MEMS pressure sensor.

According to a twenty-ninth aspect, a method 200 for testing a sensor arrangement 100 can include the following steps: producing 210 a defined temperature change $\Delta T$ of a fluid F situated in a volume region 130, wherein the temperature change $\Delta T$ of the fluid F brings about a pressure change $\Delta P$ in the volume region 130, capturing 220 the pressure change $\Delta P$ in the volume region 130 by a pressure transducer 110 in fluid connection with the volume region 130 having the fluid F, outputting 230 a pressure signal with a signal curve $S_{\Delta P}$ depending on the pressure change $\Delta P$ in response to the pressure change $\Delta P$ in the volume region 130, and ascertaining 240 a current functional parameter $F_{IST}$ of the pressure transducer 110 on the basis of the signal curve $S_{\Delta P}$ of the pressure signal $S_P$, which is obtained during the temperature change $\Delta T$ in the volume region 130.

According to a thirtieth aspect with reference to the twenty-ninth aspect, the pressure change $\Delta P$ in the volume region 130 can be captured in relation to a reference pressure $P_{REF}$ in a reference volume region 190 in the step 220 of capturing the pressure change $\Delta P$ in order to output the pressure signal $S_P$ with the signal curve $S_{\Delta P}$ depending on the pressure change $\Delta P$.

According to a thirty-first aspect with reference to the twenty-ninth aspect, the step of producing 210 a defined temperature change $\Delta T$ further can include the following step: activating 220A a heating element 150 in order to bring about a defined temperature increase $\Delta T$ of the fluid F situated in the volume region 130, and/or deactivating 220B the heating element 150 following an activated state of same in order to bring about a temperature reduction of the fluid F situated in the volume region 130.

According to a thirty-second aspect with reference to the twenty-ninth aspect, the ascertaining step 240 further can include the following steps: ascertaining a calibration information item $I_{CAL}$ for the pressure transducer 110 on the basis of the current functional parameter $F_{IST}$ of the pressure transducer 110 by comparing the current functional parameter $F_{IST}$ to a setpoint functional parameter $F_{SOLL}$ of the pressure transducer 110 in order to obtain a comparison result and by determining the calibration information item $I_{CAL}$ for the pressure transducer 110 on the basis of the comparison result.

According to a thirty-third aspect with reference to the twenty-ninth aspect, the method 200 further can include the following step: changing 250 an operational parameter or processing parameter for the pressure transducer 110 on the basis of the calibration information item, wherein a modified operational parameter of the pressure transducer 110 brings about a modified actuation of the pressure transducer 110 and wherein a modified processing parameter of the pressure transducer 110 brings about modified conditioning of the pressure transducer.

Although some aspects have been described in connection with an apparatus, it goes without saying that these aspects are also a description of the corresponding method, which means that a block or a structural element of an apparatus can also be understood as a corresponding method step or as a feature of a method step. Similarly, aspects which have been described in connection with or as a method step are also a description of a corresponding block or detail or feature of a corresponding apparatus. Some or all of the method steps can be executed by a hardware apparatus (or by using a hardware apparatus), such as a microprocessor, a programmable computer or an electronic circuit for example. In some exemplary embodiments, some or a plurality of the most important method steps can be executed by such an apparatus.

Depending on particular implementation requirements, exemplary embodiments of the invention may be implemented in hardware or in software or at least partly in hardware or at least partly in software. The implementation can be carried out by using a digital storage medium, for example a floppy disk, a DVD, a Blu-ray disk, a CD, a ROM, a PROM, an EPROM, an EEPROM or a FLASH memory, a hard disk or another magnetic or optical memory which stores electronically readable control signals which can interact, or interact, with a programmable computer system such that the respective method is carried out. Therefore, the digital storage medium may be computer-readable.

Some exemplary embodiments according to the invention thus comprises a data storage medium which has electronically readable control signals which are capable of interacting with a programmable computer system such that one of the methods described herein is carried out.

Generally, exemplary embodiments of the present invention may be implemented as a computer program product with a program code, the program code being operative so as to carry out one of the methods when the computer program product is executed on a computer.

By way of example, the program code may also be stored on a machine-readable storage medium.

Other exemplary embodiments comprise the computer program for carrying out one of the methods described herein, wherein the computer program is stored on a machine-readable storage medium. In other words, one exemplary embodiment of the method according to the invention is therefore a computer program which has a program code for carrying out one of the methods described herein when the computer program is executed on a computer.

A further exemplary embodiment of the methods according to the invention is therefore a data storage medium (or a digital storage medium or a computer-readable medium) on which the computer program for carrying out one of the methods described herein is recorded. The data storage medium or the digital storage medium or the computer-readable medium is typically tangible and/or nonvolatile.

A further exemplary embodiment of the method according to the invention is therefore a data stream or a sequence of signals which represent(s) the computer program for carrying out one of the methods described herein. The data stream or the sequence of signals may be configured, by way of example, to be transferred via a data communication link, for example via the Internet.

A further exemplary embodiment comprises a processing device, for example a computer or a programmable logic component, which is configured or customized to carry out one of the methods described herein.

A further exemplary embodiment comprises a computer on which the computer program for carrying out one of the methods described herein is installed.

A further exemplary embodiment according to the invention comprises an apparatus or a system which is designed to transmit a computer program for carrying out at least one of the methods described herein to a receiver. The transmission can take place electronically or optically, for example. The receiver may be a computer, a mobile device, a memory device or a similar apparatus, for example. The apparatus or the system may comprise a file server for transmitting the computer program to the receiver, for example.

In some exemplary embodiments, a programmable logic component (for example a field-programmable gate array, an FPGA) can be used to carry out some or all functionalities of the methods described herein. In some exemplary embodiments, a field-programmable gate array can interact with a microprocessor in order to carry out one of the methods described herein. Generally, the methods in some exemplary embodiments are carried out by an arbitrary hardware apparatus. This may be a universally useable piece of hardware such as a computer processor (CPU) or hardware which is specific to the method, such as an ASIC.

The exemplary embodiments described above are merely an illustration of the principles of the present invention. It goes without saying that modifications and variations of the arrangements and details described herein will be apparent to other persons skilled in the art. It is therefore intended that the invention be limited only by the scope of protection of the patent claims which follow and not by the specific details which have been presented herein by means of the description and the explanation of the exemplary embodiments.

What is claimed is:
1. A sensor arrangement comprising:
a pressure transducer configured to be in fluid connection with a volume region having a fluid, wherein the pressure transducer is configured to output a pressure signal in response to a pressure change in the volume region, the pressure signal comprising a signal curve that depends on the pressure change,
a heating element configured to provide a defined temperature change of the fluid situated in the volume region, wherein the defined temperature change of the fluid brings about a corresponding pressure change in the volume region, and a processing device configured to ascertain a current functional parameter of the pressure transducer based on the signal curve of the pressure signal obtained in the volume region due to the defined temperature change provided by the heating element, and ascertain calibration information on the basis of a comparison between a first signal curve of the pressure signal in the case of a heating of the fluid in the volume region and a second signal curve of the pressure signal in the case of a cooling of the fluid in the volume region.

2. The sensor arrangement as claimed in claim 1, wherein the pressure transducer is configured to capture the pressure change in the volume region in relation to a reference pressure in a reference volume region.

3. The sensor arrangement as claimed in claim 1, wherein the pressure transducer comprises a differential pressure sensor or an absolute pressure sensor.

4. The sensor arrangement as claimed in claim 1, wherein the heating element is configured to provide a defined temperature increase of the fluid situated in the volume region upon an activation.

5. The sensor arrangement as claimed in claim 4, wherein the heating element, upon a deactivation following the activation, is further configured to provide a temperature reduction of the fluid situated in the volume region.

6. The sensor arrangement as claimed in claim 1, wherein the processing device is further embodied to further ascertain the calibration information for the pressure transducer on the basis of the current functional parameter of the pressure transducer.

7. The sensor arrangement as claimed in claim 6, wherein the processing device is further configured to compare the current functional parameter to a setpoint functional parameter of the pressure transducer, obtain a comparison result, and ascertain the calibration information for the pressure transducer on the basis of the comparison result.

8. The sensor arrangement as claimed in claim 7, wherein the processing device is further configured to modify an operational parameter or a processing parameter for the pressure transducer on the basis of the calibration information.

9. The sensor arrangement as claimed in claim 8, wherein the processing device is configured to provide a modified actuation of the pressure transducer on the basis of the modified operational parameter of the pressure transducer.

10. The sensor arrangement as claimed in claim 8, wherein the processing device is configured to provide modified conditioning or processing of the pressure signal on the basis of the modified processing parameter of the pressure transducer.

11. The sensor arrangement as claimed in claim 6, wherein the current functional parameter is a fluid permeability of one or more equalization openings of the pressure transducer.

12. The sensor arrangement as claimed in claim 11, wherein the processing device is further configured to ascertain a lower limit frequency of the signal curve, wherein a reduction in the lower limit frequency indicates a reduced fluid permeability of one or more equalization openings of the pressure transducer.

13. The sensor arrangement as claimed in claim 6, wherein the current functional parameter is based on a mechanical membrane flexibility of a membrane of the pressure transducer.

14. The sensor arrangement as claimed in claim 13, wherein the processing device is further configured to ascertain a maximum signal amplitude of the signal curve, wherein a change in the maximum signal amplitude of the signal curve indicates a change in the mechanical membrane flexibility of the membrane of the pressure transducer.

15. The sensor arrangement as claimed in claim 13, wherein the processing device is further configured to ascertain a maximum signal amplitude of the signal curve, wherein a deviation of the maximum signal amplitude of the signal curve from a setpoint value indicates a deviation of the mechanical membrane flexibility of the membrane of the pressure transducer from a corresponding setpoint value.

16. The sensor arrangement as claimed in claim 15, wherein the processing device is configured to provide a value for a modified electrical bias of the membrane of the pressure transducer as the calibration information item in order to obtain the setpoint value for the mechanical membrane flexibility of the pressure transducer on the basis of the modified electrical bias.

17. The sensor arrangement as claimed in claim 6, wherein the sensor arrangement comprises a plurality of pressure transducers, wherein the current functional parameter is phase information of the respective signal curve of the pressure signal in the plurality of pressure transducers.

18. The sensor arrangement as claimed in claim 17, wherein the current functional parameter is a phase alignment of the signal curve of the pressure signal in the plurality of pressure transducers.

19. The sensor arrangement as claimed in claim 17, wherein the processing device is further configured to ascertain a phase alignment of the signal curve of the respective pressure signal of the plurality of pressure transducers, wherein a different phase alignment of the signal curve of the respective pressure signal indicates an incorrect installation of the pressure transducer.

20. The sensor arrangement as claimed in claim 19, wherein the processing device is further configured to provide a value for an inversion of the pressure signal of the plurality of pressure transducers in which an inverted phase alignment of the signal curve of the respective pressure signal is present, as the calibration information.

21. The sensor arrangement as claimed in claim 17, wherein the sensor arrangement comprises the plurality of pressure transducers that are arranged in a pressure transducer array, wherein the processing device is further configured to ascertain a phase offset of the signal curves of the pressure signals from a plurality of different pressure transducers of the pressure transducer array.

22. The sensor arrangement as claimed in claim 21, wherein the processing device is further configured to provide a phase adaptation of one or more pressure signals of the pressure transducers in the pressure transducer array as the calibration information.

23. The sensor arrangement as claimed in claim 6, wherein the current functional parameter is an ambient condition.

24. The sensor arrangement as claimed in claim 23, wherein the ambient condition is an ambient temperature, an ambient air pressure, an ambient humidity or an ambient gas component in the ambient atmosphere.

25. The sensor arrangement as claimed in claim 1, wherein the processing device is further configured to ascertain the calibration information on the basis of a symmetry consideration between the first and the second signal curve of the pressure signal.

26. The sensor arrangement as claimed in claim 1, wherein the sensor arrangement is a photoacoustic sensor arrangement.

27. The sensor arrangement as claimed in claim 1, wherein the sensor arrangement is a pressure sensor arrangement with an MEMS pressure sensor.

28. The sensor arrangement as claimed in claim 1, wherein the heating element is embodied as an ohmic resistance element, an impedance element or an optically absorbing area.

29. A method for testing a sensor arrangement comprising the following steps:
    producing a defined temperature change of a fluid situated in a volume region, wherein the defined temperature change of the fluid brings about a pressure change in the volume region,
    capturing the pressure change in the volume region by a pressure transducer in fluid connection with the volume region having the fluid,
    outputting a pressure signal with a signal curve depending on the pressure change in response to the pressure change in the volume region,
    ascertaining a current functional parameter of the pressure transducer on the basis of the signal curve of the pressure signal, which is obtained during the defined temperature change in the volume region, and
    ascertaining calibration information on the basis of a comparison between a first signal curve of the pressure signal in the case of a heating of the fluid in the volume region and a second signal curve of the pressure signal in the case of a cooling of the fluid in the volume region.

30. The method as claimed in claim 29, wherein the pressure change in the volume region is captured in relation to a reference pressure in a reference volume region in the step of capturing the pressure change in order to output the pressure signal with the signal curve depending on the pressure change.

31. The method as claimed in claim 29, wherein the step of producing the defined temperature change further includes the following step:
    activating a heating element in order to bring about a defined temperature increase of the fluid situated in the volume region; or
    deactivating the heating element following an activated state of same in order to bring about a temperature reduction of the fluid situated in the volume region.

32. The method as claimed in claim 29, wherein the ascertaining the current functional parameter further includes the following steps:
    ascertaining the calibration information for the pressure transducer on the basis of the current functional parameter of the pressure transducer by comparing the current functional parameter to a setpoint functional parameter of the pressure transducer in order to obtain a comparison result and by determining the calibration information for the pressure transducer on the basis of the comparison result.

33. The method as claimed in claim 32, further including the following steps:
    modifying an operational parameter or processing parameter for the pressure transducer on the basis of the calibration information,
    wherein the modified operational parameter of the pressure transducer brings about a modified actuation of the pressure transducer and wherein the modified processing parameter of the pressure transducer brings about modified conditioning of the pressure transducer.

* * * * *